(12) United States Patent
Kim et al.

(10) Patent No.: US 7,885,231 B2
(45) Date of Patent: Feb. 8, 2011

(54) METHOD OF RECONFIGURING AN INTERNET PROTOCOL ADDRESS IN HANDOVER BETWEEN HETEROGENEOUS NETWORKS

(75) Inventors: Yong-Ho Kim, Bucheon-si (KR); Yong Won Kwak, Anyang (KR); Jin Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 853 days.

(21) Appl. No.: 11/404,189

(22) Filed: Apr. 14, 2006

(65) Prior Publication Data

US 2007/0091846 A1 Apr. 26, 2007

(30) Foreign Application Priority Data

| Apr. 14, 2005 | (KR) | ...................... 10-2005-0031202 |
| Apr. 28, 2005 | (KR) | ...................... 10-2005-0035786 |
| May 13, 2005 | (KR) | ...................... 10-2005-0040267 |
| Jul. 5, 2005 | (KR) | ...................... 10-2005-0059985 |
| Feb. 18, 2006 | (KR) | ...................... 10-2006-0015952 |

(51) Int. Cl.
*H04W 4/00* (2009.01)
*H04W 36/00* (2009.01)

(52) U.S. Cl. ......................... 370/331; 370/338; 455/437

(58) Field of Classification Search ................. 370/331, 370/338, 401; 455/436, 437; 709/218
See application file for complete search history.

(56) References Cited

U.S. PATENT DOCUMENTS

| 7,676,226 | B2 * | 3/2010 | Han et al. .................... 455/436 |
| 2003/0104814 | A1 | 6/2003 | Gwon et al. | |
| 2004/0064581 | A1 * | 4/2004 | Shitama et al. ............. 709/238 |
| 2004/0097232 | A1 * | 5/2004 | Haverinen ................... 455/436 |
| 2005/0157681 | A1 * | 7/2005 | Tajima ........................ 370/332 |
| 2005/0163080 | A1 * | 7/2005 | Suh et al. .................... 370/331 |
| 2005/0243770 | A1 * | 11/2005 | Devarapalli et al. ......... 370/331 |
| 2005/0272481 | A1 * | 12/2005 | Kim ............................ 455/574 |

(Continued)

FOREIGN PATENT DOCUMENTS

| WO | WO 03-092316 A1 | 11/2003 |
| WO | WO 2004-045081 A2 | 5/2004 |

OTHER PUBLICATIONS

C. Perkins, "RFC 3344: IP Mobility Support for IPv4," Aug. 2002, Network Working Group, p3-79.*

(Continued)

*Primary Examiner*—Dang T Ton
*Assistant Examiner*—Ryan C Kavleski
(74) *Attorney, Agent, or Firm*—Lee, Hong, Degerman, Kang & Waimey

(57) ABSTRACT

A method of communicating information in a wireless mobile communication system is disclosed. More specifically, the method includes a network for establishing handover management modules in a source network and a target network and transmitting a handover request message from the handover management module of the source network to the handover management module of the target network. Furthermore, the network is used for receiving a handover response message from the handover management module of the target network to the handover management module of the source network, wherein the handover response message includes an internet protocol address information and transmitting a handover confirmation message from the handover management module of the source network to a mobile terminal, wherein the handover confirmation message includes the internet protocol address information.

4 Claims, 28 Drawing Sheets

U.S. PATENT DOCUMENTS

| | | |
|---|---|---|
| 2006/0002344 A1* | 1/2006 | Ono et al. .................... 370/331 |
| 2006/0104262 A1* | 5/2006 | Kant et al. .................. 370/352 |
| 2006/0140150 A1* | 6/2006 | Olvera-Hernandez et al. .......................... 370/331 |
| 2006/0153124 A1* | 7/2006 | Kant et al. .................. 370/328 |
| 2006/0159050 A1* | 7/2006 | Kim et al. .................. 370/331 |
| 2006/0183479 A1* | 8/2006 | Liu et al. .................... 455/436 |
| 2007/0058588 A1* | 3/2007 | Fashandi et al. ............ 370/331 |
| 2007/0204155 A1* | 8/2007 | Dutta et al. ................. 713/168 |

OTHER PUBLICATIONS

Anjum, F. et al.: "A Proposal for MIH Function and Information Service", IEEE 802.21 Working Group [online]. Jan. 10, 2005 [retrieved on Sep. 25, 2007]. Retrieved from the internet: <URL:http://www.ieee802.org/21/doctree/2005_Meeting_Docs/2005-01_meeting_docs/21-04-0165-03-0000-Telcordia_Toshiba_Proposal.pdf>. p. 13,15, 25-31, 35-46.

Liebsch, M. et al.: "Candidate Access Router Discovery; draftietf-seamoby-card-protocol-08.txt", IETF Seamoby Working Group, XP015027181 [online], Sep. 2004, [retrieved on Sep. 25, 2007]. Retrieved from the Internet: <URL:http://tools.ietf.org/html/draft-ietf-seamoby-card-protocol-08>. pp. 14-21, 39-42, 45, 47; figs. 1, A.1, B.2, B.3.

Koodli, R.: "Fast Handovers for Mobile IPv6; draft-ietf-mipshop-fast-mipv6-03.txt", IETF Mipshop Working Group, XP015038627 [online], Oct. 25, 2004, [retrieved on Sep. 25, 2007]. Retrieved from the Internet:<URL: http://tools.ietf.org/html/draft-ietf-mipshop-fast-mipv6-03>. figs. 2, 3; sections 6.2.1, 6.2.2, 6.3,2.

Hoghooghi, M. A. et al.: "Media Independent Handover Functions and Services Specification", IEEE 802.21 Working Group [online], Mar. 14, 2005 [retrieved on Sep. 25, 2007]. Retrieved from the Internet: <URL:http://www.ieee802.org/21/doctree/2005_Meeting_Docs/2005-03_meeting_docs/21-05-0253-01-0000-joint-harmonized-contribution.doc>.

* cited by examiner

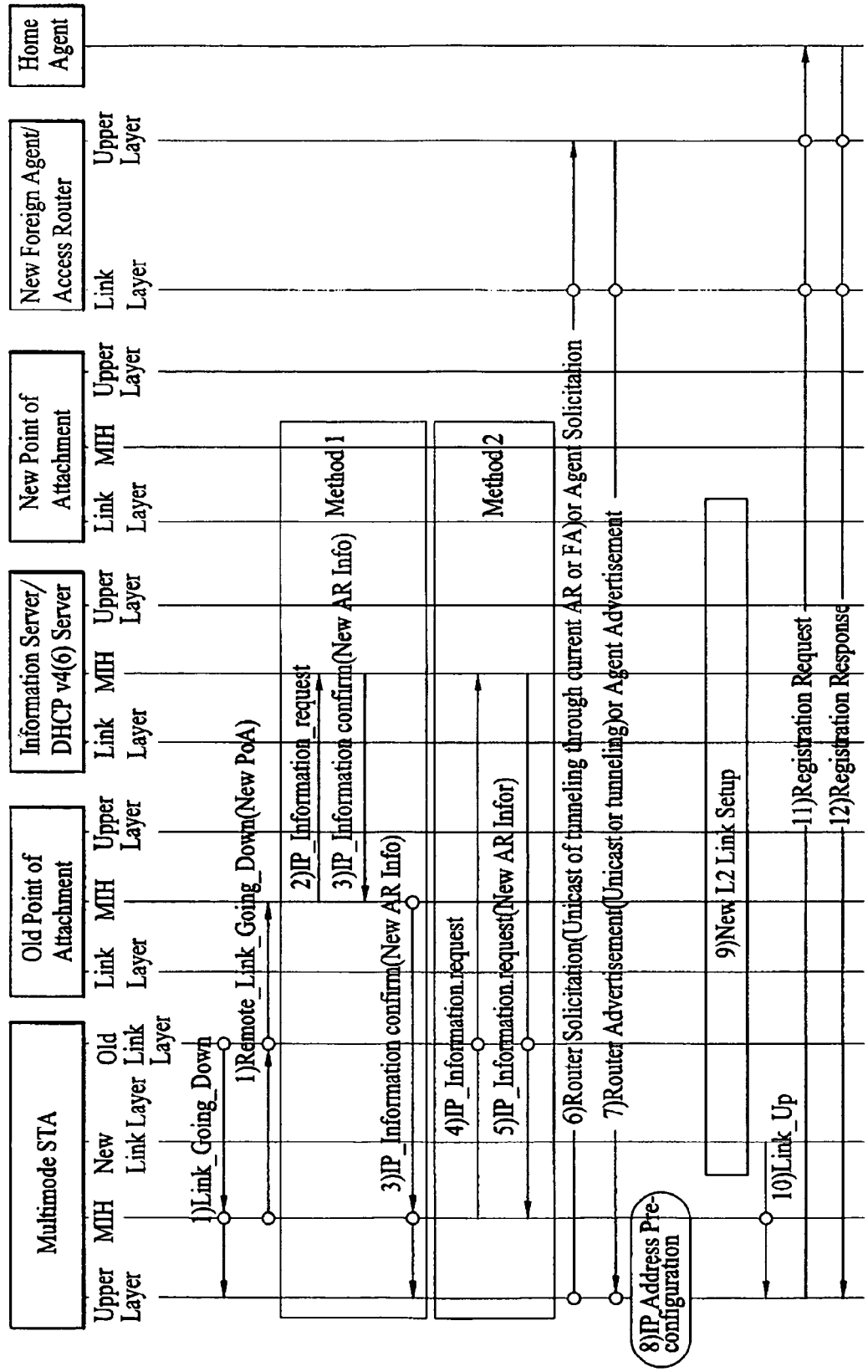

METHOD OF RECONFIGURING AN INTERNET PROTOCOL ADDRESS IN HANDOVER BETWEEN HETEROGENEOUS NETWORKS

This application claims the benefit of the Korean Patent Application Nos. 10-2005-31202, filed on Apr. 14, 2005; 10-2005-35786, filed on Apr. 28, 2005; 10-2005-40267, filed on May 13, 2005; 10-2005-59985, filed on Jul. 5, 2005; and 10-2006-15952, filed on Feb. 18, 2006, which are hereby incorporated by reference as if fully set forth herein.

BACKGROUND OF THE INVENTION

1. Field of the Invention

The present invention relates to a handover between heterogeneous networks, and more particularly, to a method of reconfiguring an IP address in handover between heterogeneous networks. Although the present invention is suitable for a wide scope of applications, it is particularly suitable for enabling a mobile subscriber station to efficiently perform a handover between the heterogeneous networks.

2. Discussion of the Related Art

Generally, the object of IEEE802.21 in progress for International Standardization of inter-heterogeneous-network media independent handover is to enhance user's convenience for mobile subscriber station devices by providing seamless handover and service continuity between heterogeneous networks. An MIH function, an event trigger, a command service and an information service (IS) are defined as basic requirements.

A mobile subscriber station (MSS) is a multi-mode node that supports at least two interface types. Here, the interface can be, for instance, a wire-line type interface such as 802.3-based Ethernet, a wireless interface type based on IEEE802.XX such as IEEE802.11, IEEE802.15, IEEE802.16 and the like, an interface type defined by cellular standardization organization such as 3GPP and 3GPP2 and the like are possible.

FIG. 1 is a diagram of protocol stack architecture of a multi-mode mobile subscriber station.

Referring to FIG. 1, a multi-mode mobile subscriber station has a physical layer per mode and a medium access control layer per mode. And, an MIH layer lies below an IP layer.

Media independent handover (MIH) should be defined between IEEE802-series interfaces or between the 802-series interfaces such as the above-mentioned non-802-series interfaces defined by the cellular standardization organization such as 3GPP and 3GPP2. Moreover, a mobility supporting protocol of an upper layer such as Mobile IP and SIP (session initiation protocol) should be supported for the seamless handover service.

Mobile IPv4 is explained as follows.

A configuration of a network supporting a mobile IP includes a home agent, a foreign agent and a mobile subscriber station.

For the operation of the mobile IP, the following functions are required.

1) Agent Discovery

Agent discovery is a method of deciding whether a mobile subscriber station is currently connected to its home network or located at a foreign network. By this method, the mobile subscriber station can detect that it has been moved away into another network.

2) Registration

A function of registration offers a flexible mechanism enabling a service provided on a home network to be provided intact on a new network in a manner of delivering current position information to a home agent in case that a mobile subscriber station detects its migration into another network.

3) Routing

In case that a mobile subscriber station is linked to an external network, a function of routing is needed to properly route datagram to be transmitted from/to this mobile subscriber station.

4) Care of Address (CoA)

A mobile IP provides two kinds of methods of Foreign Agent (FA)-CoA and co-located CoA for establishment of care of address in case that a mobile node has moved away into another subnet.

FA-CoA is provided by a foreign agent via an agent advertisement message, in which an IP address of the foreign agent is used as a care of address. In the co-located CoA, a care of address is assigned to a mobile node via a Dynamic Host Configuration Protocol (DHCP) server located at a foreign network.

Mobile IPv6 is explained as follows.

Mobile IPv6 supports mobility more effectively than the mobile IPv4 and has extensibility better than that of the mobile IPv4. Basic elements and functions for the operation of the mobile IPv6 are explained as follows.

1) Mobile Node (MN): Host or router changing its network access.

2) Correspondent Node (CN): Host or router communicating with a mobile subscriber station.

3) Home Agent (HA): Router having registration information of a mobile subscriber station among routers in a home network to send datagram to a current position of the mobile subscriber station on an external network.

4) Care of Address (CoA): Internet Protocol (IP) address connected to a mobile subscriber station having moved away into an external network.

5) Binding: Matching CoA registered to a home agent by a mobile subscriber station and a home address of the corresponding mobile subscriber station together.

6) Binding Update (BU): Used by a mobile subscriber station to notify HA and CNs of its CoA.

7) Binding Acknowledge (BACK): Response message to BU.

8) Binding Request (BR): Message for requesting BU in case that a correspondent mobile subscriber station fails in receiving the BU before a timer of binding information of a mobile subscriber station expires.

9) CoA Acquisition: Position information can be automatically configured in mobile subscriber station shift using functions of neighbor discovery and address auto-configuration.

10) Router Optimization: Correspondent mobile subscriber station can directly communicate with a mobile node without a home agent after having stored binding information.

11) Address Auto-configuration

Auto-creation of an IP address is classified into a status preserving type address auto-configuration for acquiring an address using such a server as DHCP and a non-status address auto-configuration for creating an address of its own by a host side. In the method using the server, if a host side requests an address from a DHCP server, one of available addresses is allocated to the host side by the DHCP server. In the non-status type address auto-configuration, an address is created in a manner of binding its interface ID information and prefix information acquired from a router or well-known prefix information together.

FMIPv6 (Fast Handovers for Mobile IPv6) is explained as follows.

First of all, FMIPv6 is a protocol to reduce an overall handover delay in Layer 3 by making rapid progress of motion detection and NCoA (new care of address) acquisition based on handover estimation information in Layer 2. Basic elements and messages for the operation of FMIPv6 are explained in the following description.

1) PAR (previous access router): Default router prior to handover of a mobile node.

2) NAR (new access router): Default router estimated in a handover of a mobile node.

3) PCoA (previous care of address): Valid CoA of a mobile node in PAR subnet.

4) NCoA (new care of address): Valid CoA of a mobile node in NAR subnet.

5) RtSolPr (router solicitation for proxy): Making a request for information for potential handover via a message sent to PAR from a mobile node.

6) PrRtAdv (proxy router advertisement): offering information for a neighbor link via a message sent to a mobile node from PAR and operating as a trigger for a network initiated handover.

7) FBU (fast binding update): Message that a mobile node requests a PAR to change its traffic receiving place into NAR.

8) FBACK (fast binding acknowledge): Response message to FBU generated from PAR.

9) HI (handover initiation): Message sent to NAR from PAR to indicate a handover of a mobile node.

10) HACK (handover acknowledge): Message sent to PAR from NAR in response to HI.

11) FNA (fast neighbor advertisement): Message sent to NAR from a mobile node to indicate that the mobile node confirms a use of NCoA and accesses a new network in case of failing to receive FBACK yet.

MIH function is placed below an IP layer and facilitates a handover handling process using a trigger event and an input value from a second layer (Layer 2) such as information of other networks and the like. The MIH function can include input values based on user policy and configuration that can put influence on a handover process, and general interfaces are defined between the MIH function and a third layer (Layer 3) entity such as Mobile IP and SIP. These interfaces provide information about a first layer (Layer 1) (physical layer), the second layer (Layer 2) (MAC layer) and mobility management, and the MIH acquires information about lower layers and network with the help of the event and information service.

An upper management entity is placed in an upper layer to monitor and control statuses of various links within a mobile subscriber station and plays roles as a handover control function and a device manager function. In this case, the handover control function and the device manager function can be independently and respectively located. Alternatively, both of the functions may be included together as an upper management entity.

FIG. 2 is a diagram of functional entities and transport protocol of a mobile subscriber station and network having MIH functions, in which dotted lines indicate primitives, event triggers and the like.

For fast handover, a network layer needs to use information from a link layer to re-establish a connection as soon as possible. A link layer event helps to estimate a user's movement and may help a mobile subscriber station and network to prepare handover in advance.

A trigger for handover may start with a physical layer (PHY) and a medium access control layer (MAC). An origin of this trigger may be a local stack or a remote stack. FIG. 3 is a diagram of a trigger model.

An event trigger provides a state of a current signal, a state change of another network and an estimated change and also provides a change between a physical layer and a medium access control layer and attribute changes of a specific network.

Event types can be classified into PHY layer event, MAC layer event, Management event, L3 event, Application event and the like.

A basic trigger event is explained as follows.

First of all, 'Link_Up' occurs in case that a Layer 2 connection is established on a specific link interface and in case that L3 packets can be transferred from a higher layer. In this case, it is decided that all L2 configurations configuring the link are completed. And, event sources are 'Local MAC' and 'Remote MAC'. Parameters of 'Link_Up' are shown in Table 1.

TABLE 1

| Name | Type | Description |
| --- | --- | --- |
| EventSource | EVENT_LAYER_TYPE | Source from which event is generated |
| EventDestination | EVENT_LAYER_TYPE | Destination to which event shall be delivered |
| MacMobileTerminal | MAC Address | MAC address of MSS |
| MacOldAccessRouter | MAC Address | MAC address of old access router |
| MacNewAccessRouter | MAC Address | MAC address of new access router |
| NetworkIdentifier | Media Specific | Network Identifier usable in detecting change of subnet |

'Link_Down' occurs in case that an L2 connection is released on a specific interface and in case that it is unable to transfer L3 packets anymore. And, an event source is 'Local MAC'. Parameters of 'Link Down' are shown in Table 2.

TABLE 2

| Name | Type | Description |
| --- | --- | --- |
| EventSource | EVENT_LAYER_TYPE | Source from which event is generated |
| EventDestination | EVENT_LAYER_TYPE | Destination to which event shall be delivered |
| MacMobileTerminal | MAC Address | MAC address of MSS |
| MacOldAccessRouter | MAC Address | MAC address of old access router |
| ReasonCode | | Reason why link is released |

'Link_Going_Down' occurs in case that it is estimated that an L2 connection is going to link down within a specific time. And, 'Link Going Down' may be a signal for initializing a handover procedure. Event sources are 'Local MAC' and 'Remote MAC'. And, parameters of 'Link_Going_Down' are shown in Table 3.

TABLE 3

| Name | Type | Description |
| --- | --- | --- |
| EventSource | EVENT_LAYER_TYPE | Source from which event is generated |
| EventDestination | EVENT_LAYER_TYPE | Destination to which event shall be delivered |
| MacMobileTerminal | MAC Address | MAC address of MSS |
| MacOldAccessRouter | MAC Address | MAC address of old access router |
| MacNewAccessRouter | MAC Address | MAC address of new access router |
| TimeInterval | Time in msecs | Estimated time for Link_Down |
| ConfidenceLevel | % | Estimated level for Link_Down of link in a specific time |
| UniqueEventIdentifier | | Used in case that Event rollback occurs |

'Link_Going_Up' occurs in case that it is estimated that an L2 connection is going to 'link up' within a specific time. And, 'Link Going Up' is used in case that it takes a long time for a network to be initialized. Event sources are 'Local MAC' and 'Remote MAC'. And, parameters of 'Link_Going_ Up' are shown in Table 4.

TABLE 4

| Name | Type | Description |
| --- | --- | --- |
| EventSource | EVENT_LAYER_TYPE | Source from which event is generated |
| EventDestination | EVENT_LAYER_TYPE | Destination to which event shall be delivered |
| MacMobileTerminal | MAC Address | MAC address of MSS |
| MacNewAccessRouter | MAC Address | MAC address of new access router |
| TimeInterval | Time in msecs | Estimated time for Link_Up |
| ConfidenceLevel | % | Estimated level for Link_Up of link in a specific time |
| UniqueEventIdentifier | | Used in case that Event rollback occurs |

'Link_Event_Rollback' is combined with 'Link_Going_ Up' or 'Link_Going_Down' to use. It is a trigger occurring in case that 'Link_Going_Up' or 'Link_Going_Down' is estimated not to occur within a specific time anymore despite that 'Link_Going_Up' or 'Link_Going_Down' is transmitted. Event sources are 'Local MAC' and 'Remote MAC'. Table 5 shows parameters of 'Link_Event_Rollback'.

TABLE 5

| Name | Type | Description |
| --- | --- | --- |
| EventSource | EVENT_LAYER_TYPE | Source from which event is generated |
| EventDestination | EVENT_LAYER_TYPE | Destination to which event shall be delivered |

TABLE 5-continued

| Name | Type | Description |
| --- | --- | --- |
| MacMobileTerminal | MAC Address | MAC address of MSS |
| MacNewAccessRouter | MAC Address | MAC address of new access router |
| UniqueEventIdentifier | | Used in case that Event rollback occurs |

'Link_Available' indicates that a new specific link is usable or available. 'Link_Available' indicates possibility that a new base station or access point can provide a link quality better than that of a base station or access point currently accessed by a mobile subscriber station. Event sources are 'Local MAC' and 'Remote MAC'. And, parameters of 'Link_Available' are shown in Table 6.

TABLE 6

| Name | Type | Description |
| --- | --- | --- |
| EventSource | EVENT_LAYER_TYPE | Source from which event is generated |
| EventDestination | EVENT_LAYER_TYPE | Destination to which event shall be delivered |
| MacMobileTerminal | MAC Address | MAC address of MSS |
| MacNewAccessRouter | MAC Address | MAC address of new access router |
| MacOldAccessRouter | MAC Address | MAC address of old access router |

'Link_Parameters_Change' is an event occurring in case that a variation of a link parameter value exceeds a specific limit. This can include a link layer parameter such as a link speed, QoS (quality of service), encryption value and the like. Event sources are 'Local MAC' and 'Remote MAC'. And, parameters of 'Link_Parameters_Change' are shown in Table 7.

TABLE 7

| Name | Type | Description |
| --- | --- | --- |
| EventSource | EVENT_LAYER_TYPE | Source from which event is generated |
| EventDestination | EVENT_LAYER_TYPE | Destination to which event shall be delivered |
| MacMobileTerminal | MAC Address | MAC address of MSS |
| MacAccessRouter | MAC Address | MAC address of current access router |
| oldValueOfLinkParameter | | Old value of link parameter |
| newValueOfLinkParameter | | New value of link parameter |

'MIH_Scan' is a command used in discovering neighbor access points of a current access network by an upper layer. The 'MIH_Scan' is created if an upper layer entity requests a scan of an accessible network. If several links are requested, a plurality of Link_Scan commands can begin with various kinds of media san request informations.

MIH_Handover_Initiate.request is a primitive used by an upper layer entity to deliver an intention of a handover initiation between an MIH function of a mobile subscriber station and an MIH function of a network.

MIH_Handover_Initiate.response is a primitive which indicates corresponding information by selecting a preferable link according to situations of the requested links in response to MIH_Handover_Initiate.request.

MIH_Handover_Commit.request message is used to initiate buffering to be performed on data to be forwarded to a mobile subscriber station via the previous access point by informing a previous access point that a handover is substantially initiated for the selected link.

MIH_Handover_Commit.response message is a response message to the MIH_Handover_Commit.request message used to indicate a success or failure of handover.

FIG. 4 is an exemplary diagram of a trigger occurring until a new link is created since a quality of link currently accessed by a mobile subscriber station is degraded.

Information Service provides detailed information for a network necessary for network discovery and selection and should be accessible by any kind of network. The information service should include information elements such as link access parameter, security mechanism, neighbor map, location, service provider and other access information, cost of link and the like.

A detailed operational procedure of Mobile IPv4 is explained as follows.

First of all, the basic object of Mobile IPv4 is to support transparent mobility of an upper layer and needs additional functions of mobile host, home agent and foreign agent. Yet, in case of not using path optimization, a change of a correspondent node communicating with a mobile subscriber station is unnecessary. In this case, the mobile host represents an IP host supported by mobility. The home agent is a router that sustains location information for the mobile host and performs tunneling. And, the foreign agent means a router supporting mobility in a foreign network.

Basic actions in Mobile IPv4 can be explained as shown in FIG. 5.

An action per step in FIG. 5 is explained as follows.

(1) In case that a mobile host moves away into a foreign network from its home network, the mobile host recognizes that it has moved by receiving an advertisement message broadcast from the foreign network and then registers a temporary address (CoA) indicating its current location to a home agent in the home network.

(2) In this case, CoA is an IP address (FA-CoA) of a foreign agent or an address allocated to the mobile host via DHCP or the like by the foreign network. Packets sent to the mobile host from outside are transferred to the home network and these packets are picked up by a home agent recognizing a movement of a mobile subscriber station.

(3) The home agent encapsulates a packet delivered to the mobile host by targeting an address of FA as a destination and then delivers it to the foreign agent.

(4) The delivered encapsulated packet is recovered into an initial delivery packet by being de-capsulated by the foreign agent and is then delivered to the mobile host finally.

(5) The packet to be delivered to a correspondent host from the mobile host can be directly delivered via the foreign agent or can be delivered using a reverse tunnel in case of a problem of ingress filtering.

Major functions necessary for Mobile IP are explained as follows.

1) Agent Discovery

Agent discovery is a method of deciding whether a mobile subscriber station is currently connected to its home network or located at a foreign network. By this method, the mobile subscriber station can detect that it has been moved away into another network.

Mobile IP extends conventional ICMP (Internet control message protocol) router discovery [IETF RFC 1256]. An agent advertisement message periodically broadcast by an agent (home agent, foreign agent) makes a mobility agent advertisement extension included in an ICMP router advertisement message to be transmitted. 'Agent Solicitation' message transmitted by a mobile subscriber station to find an agent uses the same method of a conventional 'ICMP router Solicitation' message.

2) Registration

A function of registration offers a flexible mechanism enabling a service provided on a home network to be provided intact on a new network in a manner of delivering current position information to a home agent in case that a mobile subscriber station detects its migration into another network. Mobile IP defines two different registration procedures. In case of using FA-CoA, a mobile subscriber station should make a registration via a foreign agent. In case of using co-located CoA, a mobile subscriber station makes a direct registration to a home agent.

3) Routing

In case that a mobile subscriber station is linked to an external network, a function of routing is needed to properly route datagram to be transmitted from/to this mobile subscriber station. The datagram includes multicast and broadcast packets as well as unicast packets.

FIG. 6 is a diagram for explaining a basic operation of Mobile IPv6 according to a related art.

First of all, operational steps of Mobile IPv6 can be sequentially explained in FIG. 6.

0. MN moves away into Subnet B from Subnet A

1. MN detects a migration using prefix information of RA message and NUD (neighbor unreachable detection) mechanism.

2. Obtaining CoA by itself through 'Address auto-configuration'

3. Sending BU message to inform HA of the obtained CoA

4. HA binds a home address of MN and CoA together and then sends BAck in response to BU.

5. CN firstly communicating with MN transmits a packet by setting a destination address to the home address of MN because of failing in detecting the migration of MN.

6. HA managing MN intercepts the packet to tunnel it to a current position of MN.

7. MN having received the tunneled packet decides that the CH does not have binding information and then notifies CN of its CoA by sending BU message to the CN.

8. After having stored the binding information, CN directly communicates with MN using the information.

FIG. 7 and FIG. 8 are diagrams for explaining an operational process of FMIPv6. FIG. 7 shows an operational procedure in 'proactive' mode and FIG. 8 shows an operational procedure in 'reactive' mode. There are a 'proactive' mode for sending FBU/FBACK message from/to a link of PAR and a 'reactive' mode for sending FBU/FBACK message from/to a link of NAR. In case of 'proactive' mode, certainty of a created NCoA is examined prior to releasing a connection to PAR. In case of 'reactive' mode, certainty of NCoA is checked after a mobile node has arrived at a new subnet.

An operational procedure of 'proactive mode' is explained with reference to FIG. 7 as follows.

1) A mobile node discovers APs available for handover based on L2 layer information (e.g., scan in a wireless LAN system) and then sends RtSolPr message to PAR to obtain subnet information corresponding to the discovered AP identifiers.

2) The PAR having received the RtSolPr message puts the subnet information corresponding to the APs in a tuple in [AP-ID, AR-Info] format and then sends a PrRtAdv message to the mobile node. This message can be occasionally sent 'solicit' after the mobile node has performed router detection.

3) The mobile node creates a new care of address (NCoA) based on AR-Info within the PrRtAdv message.

4) The mobile node sends FB message that requests the PAR to bind PCoA and NCoA together so that packets arriving at the PAR can be tunneled to NAR.

5) The PAR sends a notification message indicating that the mobile node will hand over to the NAR, i.e., HI. The NAR having received the HI message performs an overlapping check of the NCoA created by the mobile node. If the NCoA is not suitable as a result of the overlapping check, the NAR newly configures a CoA for the mobile node.

6) The NAR sends HACK as a response message for the HI to the PAR. In this case, a newly created NCoA can be included.

7) The PAR having received the HACK sends FBACK to the mobile node and the NAR and informs that the PAR will initiate to tunnel a packet of the mobile node to an address of a real NCoA. In this case, a connection between the mobile node and the PAR is released.

8) The packet having arrived at the PAR is forwarded to the NAR.

9) The mobile node sends FNA message to the NAR as soon as a new link to the NAR is established. So, it is informed that the mobile node itself is connected to a network of the NAR.

10) The packet is transmitted via the NAR.

And, an operational procedure of 'reactive mode' is explained with reference to FIG. 8 as follows.

1) A mobile node discovers APs available for handover based on L2 layer information (e.g., scan in a wireless LAN system) and then sends RtSolPr message to PAR to obtain subnet information corresponding to the discovered AP identifiers.

2) The PAR having received the RtSolPr message puts the subnet information corresponding to the APs in a tuple in [AP-ID, AR-Info] format and then sends a PrRtAdv message to the mobile node. This message can be occasionally sent 'solicit' after the mobile node has performed router detection.

3) The mobile node creates a new care of address (NCoA) based on AR-Info within the PrRtAdv message.

4) The mobile node initiates a procedure of forwarding an arriving packet to the NAR immediately in a manner of encapsulating FBU message in FNA message as soon as connected to the NAR. And, the mobile node makes the NAR check whether the NCoA is valid.

5) The NAR sends FB message to the PAR to bind PCoA and NCoA together. If the NCoA is not valid in the FBU received by the NAR, the NAR discards FBU packet and sends a router advertisement having a substitute address therein.

6) The PAR sends FBACK as a response message for the FBU to the NAR. In this case, a tunneling establishment is completed between an actual PAR and NAR.

7) The packet having arrived at the PAR is forwarded to the NAR.

8) The packet is transmitted via the NAR.

However, as mentioned in the above description, the related art has the following problems.

First of all, the L2 handover procedure and the L3 handover procedure are independently generated in case of using MIPv4, MIPv6 or FMIPv6. Namely, the L3 handover is carried out after the L2 handover has been completed. So, a corresponding delay takes place.

Secondly, if a network knowing the L2 handover directly sends a message for the L3 handover, the L3 does not know this. So, an unnecessary message transmission is needed.

Thirdly, in case that communications between media independent handover entities are available for a field to which the present invention is applied, no change may be made to use in IP address re-configuration when a handover is carried out between homogeneous networks.

SUMMARY OF THE INVENTION

Accordingly, the present invention is directed to a method of reconfiguring an IP address in handover between heterogeneous networks that substantially obviates one or more problems due to limitations and disadvantages of the related art.

An object of the present invention is to provide a method of communicating information in a wireless mobile communication system.

Another object of the present invention is to provide a method of communicating information in a wireless mobile communication system from a perspective of a mobile terminal.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of communicating information in a wireless mobile communication system includes a network for establishing handover management modules in a source network and a target network and transmitting a handover request message from the handover management module of the source network to the handover management module of the target network. Furthermore, the network is used for receiving a handover response message from the handover management module of the target network to the handover management module of the source network, wherein the handover response message includes an internet protocol address information and transmitting a handover confirmation message from the handover management module of the source network to a mobile terminal, wherein the handover confirmation message includes the internet protocol address information.

In another aspect of the present invention, a method of communicating information in a wireless mobile communication system includes a mobile terminal for establishing in a mobile terminal a network handover module for converging information from the at least one network interface module associated with the at least one of a homogeneous and heterogeneous network into a unified presentation, transmitting a query message requesting an internet protocol address related message from the mobile terminal to an information server of a network, and receiving a query response message, which includes internet protocol address information of a target network, from the information server of the network It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 29 is a flowchart according to a further preferred embodiment of the present invention.

DETAILED DESCRIPTION OF THE INVENTION

Figure 1:
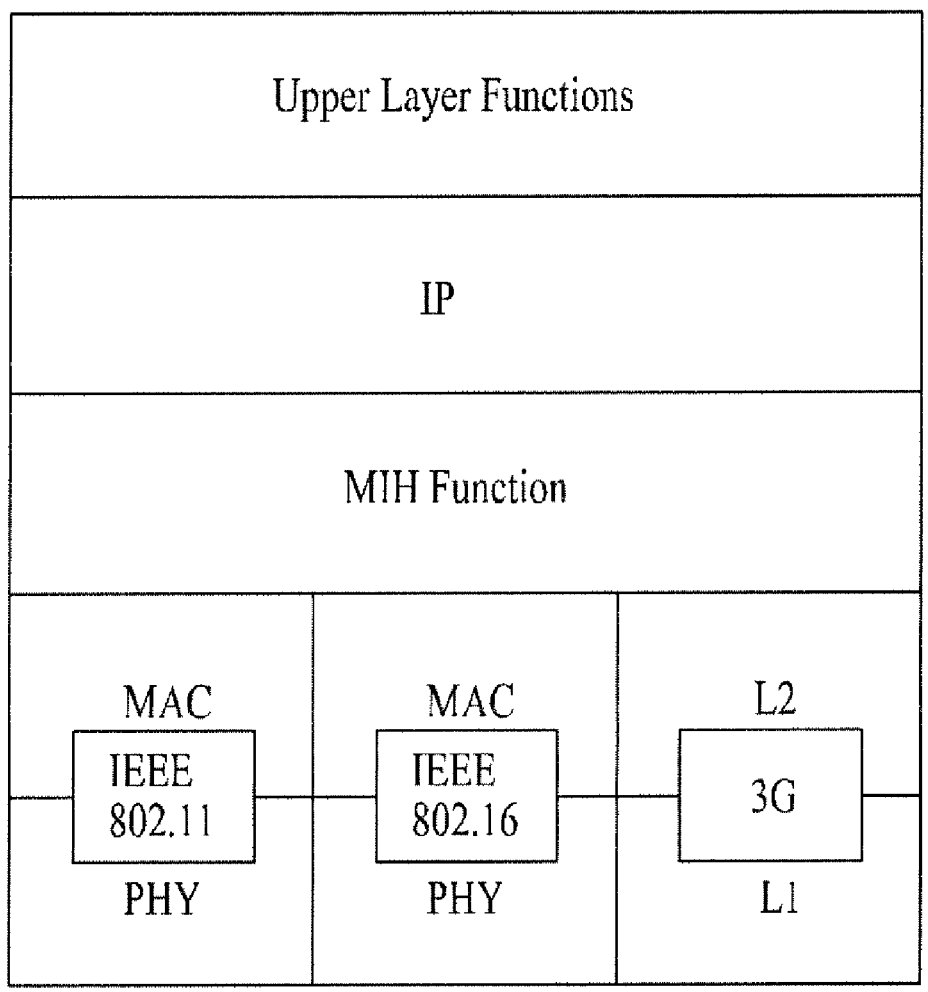
FIG. 1 is a diagram of protocol architecture of a multi-mode mobile subscriber station according to a related art.
Figure 2:
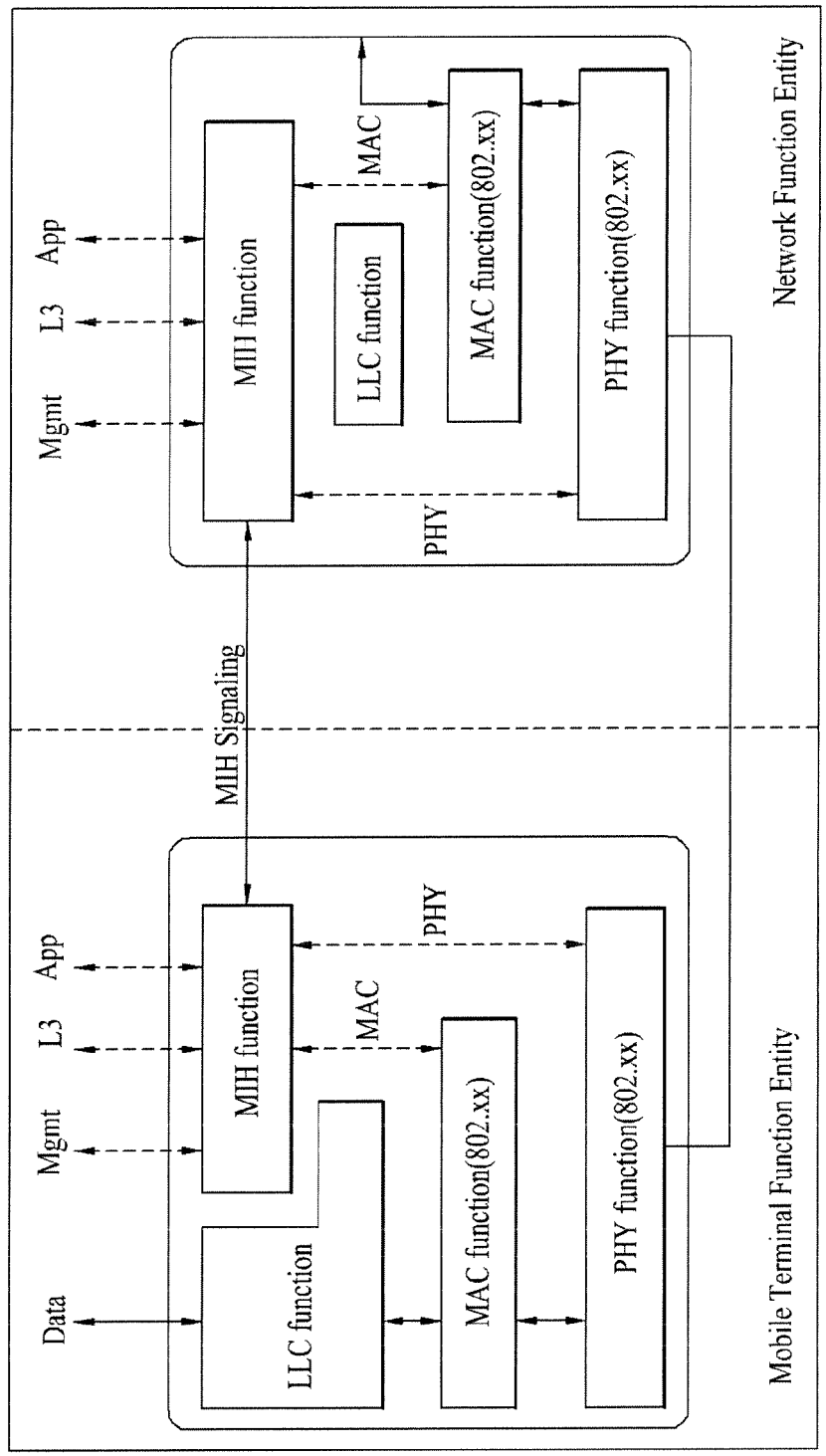
FIG. 2 is a diagram of functional entities and transport protocol of a mobile subscriber station and network having MIH functions according to a related art.
Figure 3:
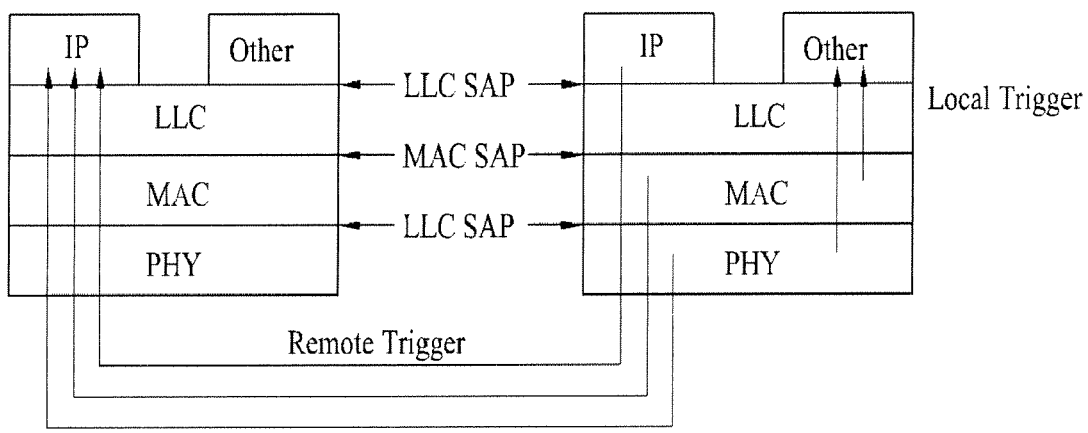
FIG. 3 is a structural diagram of a trigger model according to a related art.
Figure 4:
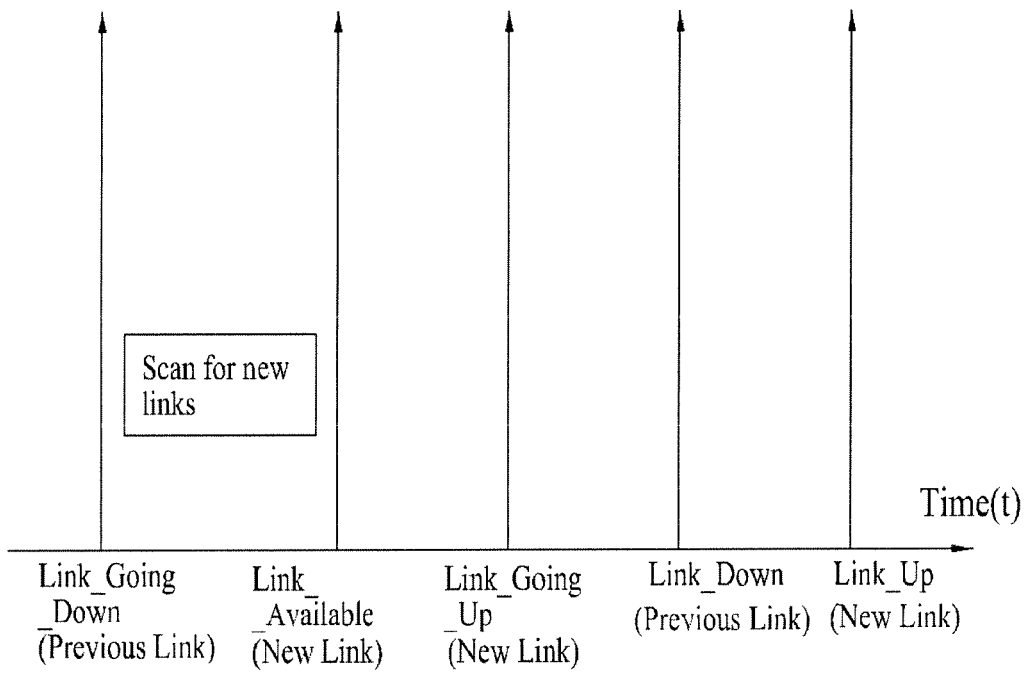
FIG. 4 is an exemplary diagram of a trigger occurring until a new link is created since a quality of link currently accessed by a mobile subscriber station is degraded according to a related art.
Figure 5:
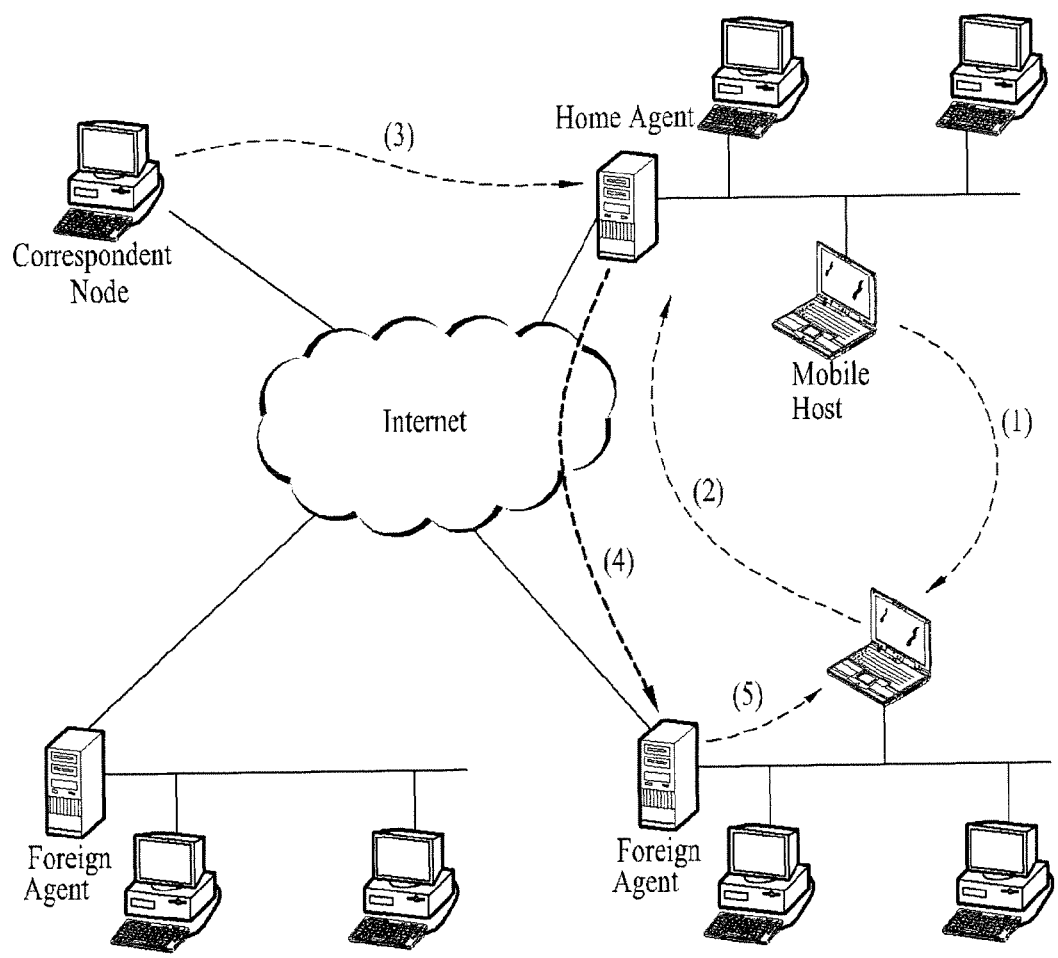
FIG. 5 is a diagram for explaining a basic operation of Mobile IPv4 according to a related art.
Figure 6:
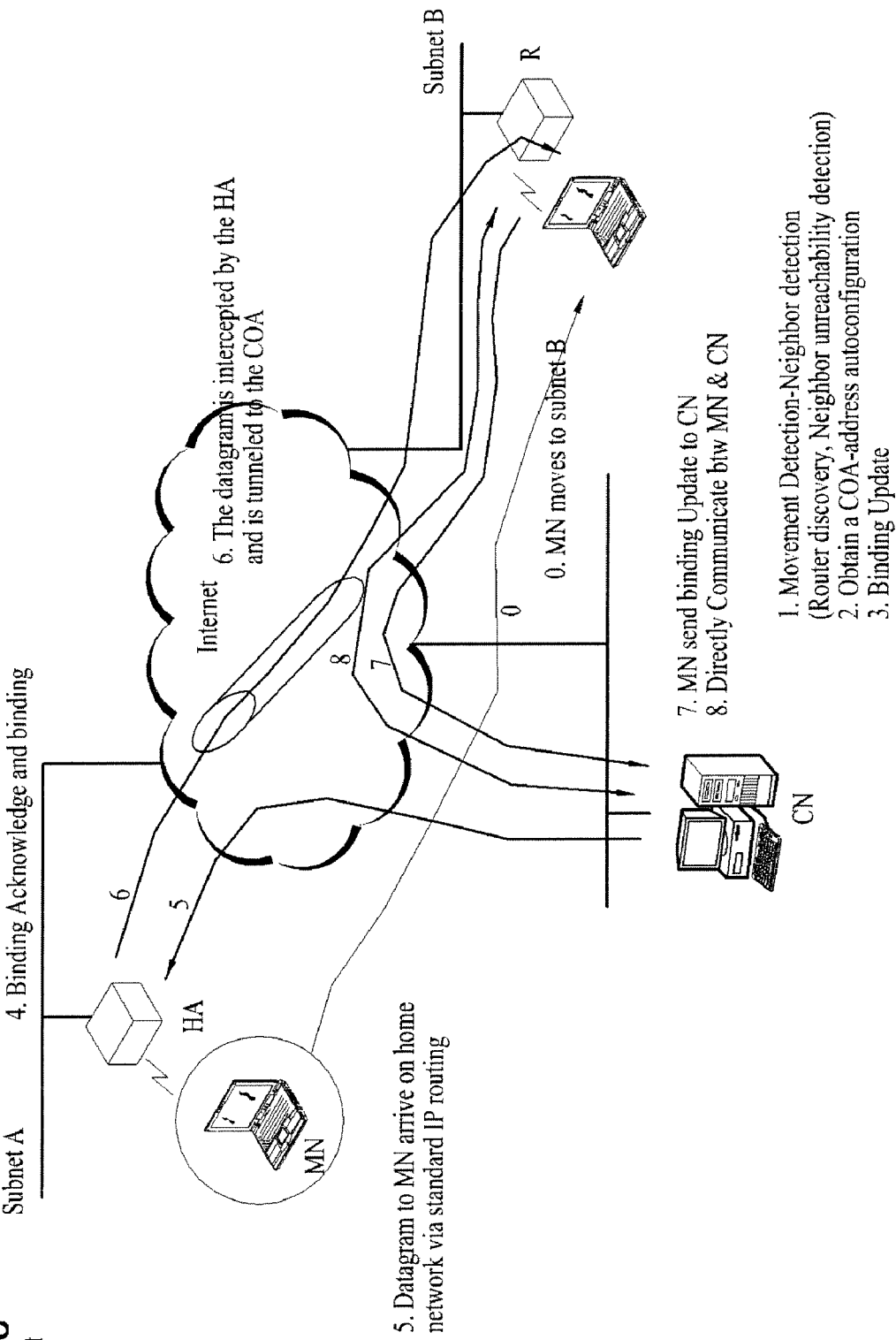
FIG. 6 is a diagram for explaining a basic operation of Mobile IPv6 according to a related art.
Figure 7:
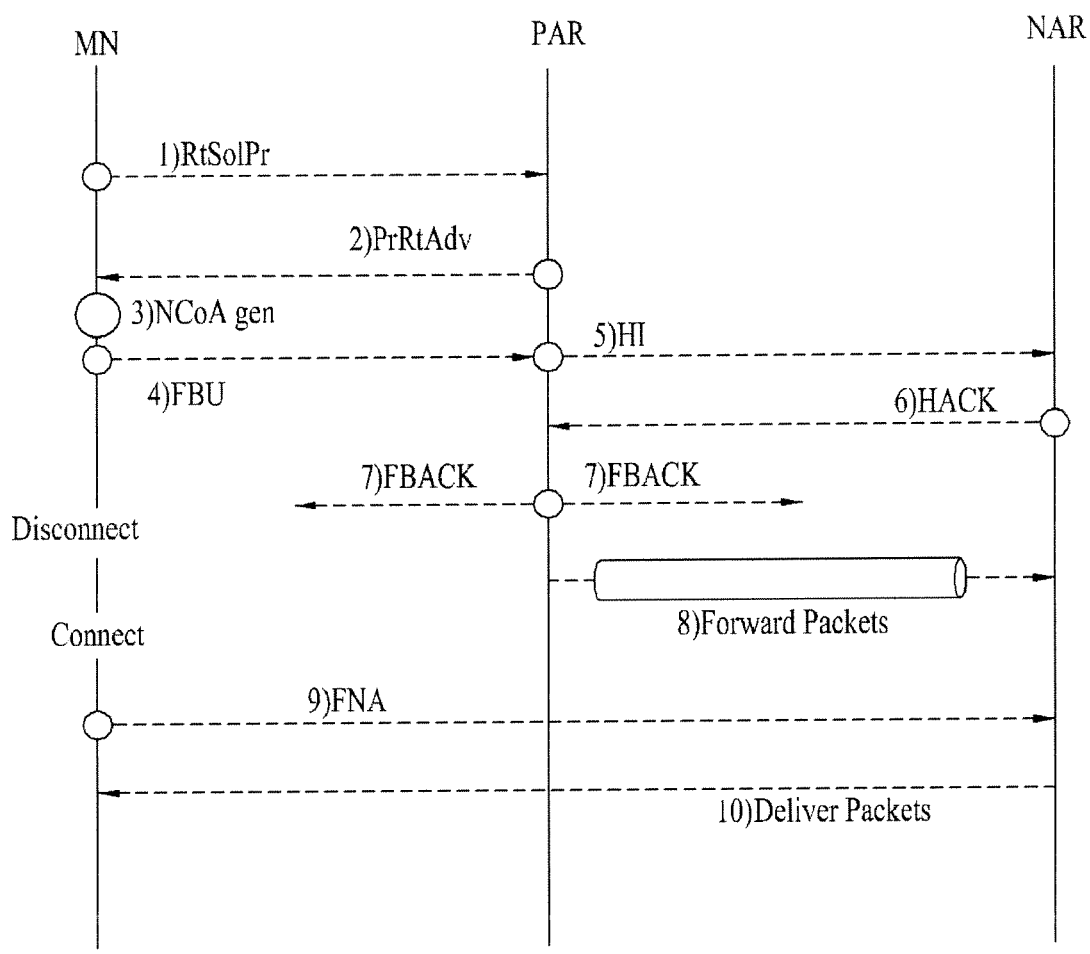
FIG. 7 and FIG. 8 are diagrams for explaining an operational process of FMIPv6 according to a related art.
Figure 8:
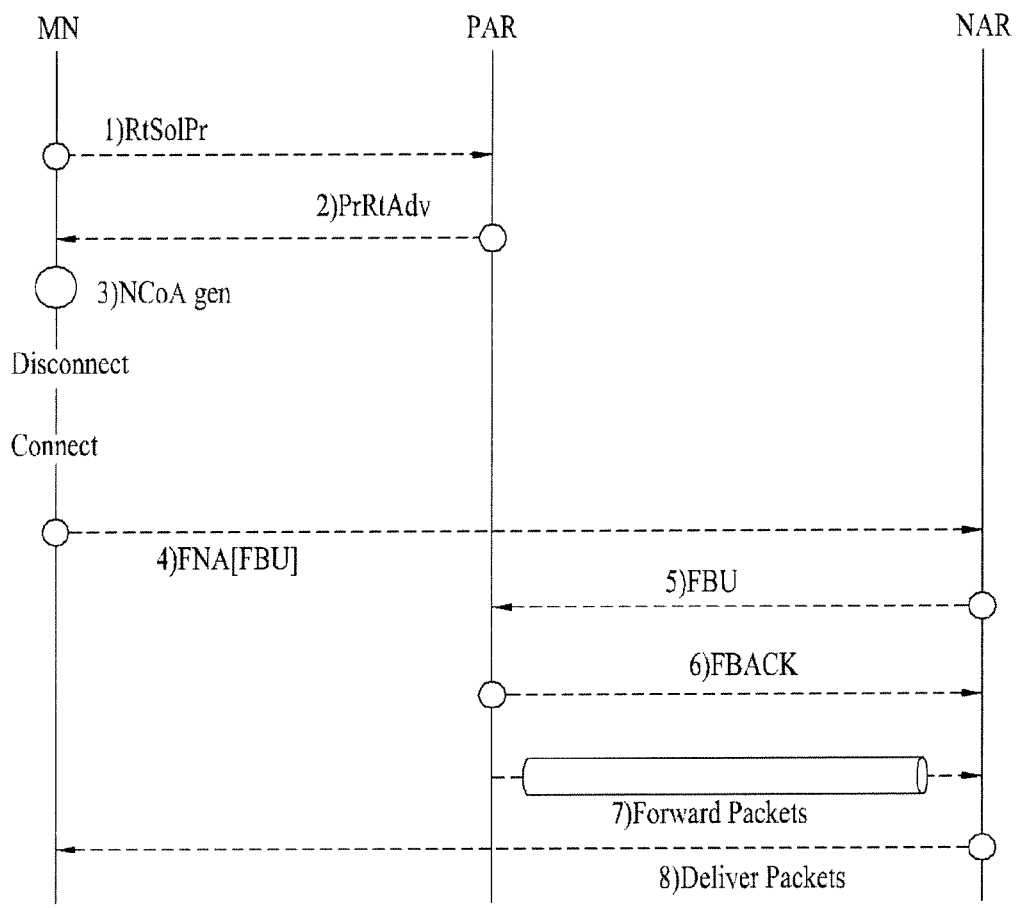

Reference will now be made in detail to the preferred embodiments of the present invention, examples of which are illustrated in the accompanying drawings. Wherever possible, the same reference numbers will be used throughout the drawings to refer to the same or like parts.

First of all, explained in the following are primitives usable for an IP address reconfiguration method in handover between heterogeneous networks according to the present invention and primitives for delivering data on reception in handover between heterogeneous networks to a new point of attachment for service continuity.

And, the primitives proposed by the present invention are usable for obtaining new access router information to acquire a new IP address from an information server.

In addition, the term mobile subscriber station (MSS) can be referred to as a mobile terminal, a mobile node, a mobile station, and a like.

Moreover, data forwarding between a previous access router and a new access router explained through embodiments of the present invention is identically applicable between an old point of attachment and a new point of attachment via communications of the primitives proposed by the present invention.

1) Inter_MIH.query

This primitive, which is an MIH signaling message between points of attachment (broadband wireless access network base station, wireless LAN AP, or cellular system base station), is a message transmitted for handover by an old point of attachment (PoA) of a mobile subscriber station to make a request for information for a new point of attachment (PoA) (e.g., access router address information, information for a presence or non-presence of a change of an access router, FA address information, information indicating whether FA is changed, or available resources) or information for a mobile subscriber station or is a message transmitted to an old PoA by a new PoA to make a request for information for a mobile subscriber station having belonged to the old PoA. If this primitive is transmitted by including a discriminator (e.g., IP address, MAC address, ESN, etc.) capable of discriminating a mobile subscriber station attempting to hand over to a new PoA from an old PoA, it is able to notify the new PoA that the specific mobile subscriber station will make a handover.

Table 8 shows an example of a data format of Inter_MIH.query primitive.

TABLE 8

| Name | Type | Description |
|---|---|---|
| CommandSource | UPPER_LAYER_TYPE | The origination point from which the command is initiated. This is usually some form of an upper layer such as a policy engine, or an L3 Mobility protocol. |

TABLE 8-continued

| Name | Type | Description |
|---|---|---|
| CommandDestination | MIH_LOCAL, MIH_REMOTE | Transport, application etc. This specifies the command destination which can be either local or remote MIH Function. |
| CurrentLinkIdentifier | NetworkIdentifier. Can be one of different 802 and Cellular networks. | This identifies the current access network over which the command needs to be sent. This is valid only for remote commands which need to be sent to remote MIHF. The command is then sent either at L2 or at L3. |
| TransportLayer | TRANSPORT_L2 TRANSPORT_L3 | This identifies the transport layer L2 or L3 over which the command needs to be sent to remote MIHF entity. This is valid only for remote commands. |
| QueryResourceList | | List of resources to be queried at the new suggested network. |

2) Inter_MIH.response

This primitive, which is an MIH signaling message between points of attachment (broadband wireless access network base station, wireless LAN AP, or cellular system base station), is transmitted to a new PoA of a mobile subscriber station from an old PoA or to the old PoA from the new PoA to receive and respond Inter_MIH.query. In case that Inter_MIH.query is used for the purpose of notification for a handover initiation of a specific mobile subscriber station or the like, this primitive is used as a corresponding 'Acknowledge'.

Table 9 shows a format of Inter_MIH.response primitive.

TABLE 9

| Name | Type | Description |
|---|---|---|
| CommandSource | UPPER_LAYER_TYPE | The origination point from which the command is initiated. This is usually some form of an upper layer such as a policy engine, or an L3 Mobility protocol. Transport, application etc. |
| CommandDestination | MIH_LOCAL, MIH_REMOTE | This specifies the command destination which can be either local or remote MIH Function. |
| CurrentLinkIdentifier | NetworkIdentifier. Can be one of different 802 and Cellular networks. | This identifies the current access network over which the command needs to be sent. This is valid only for remote commands which need to be sent to remote MIHF. The command is then sent either at L2 or at L3. |
| TransportLayer | TRANSPORT_L2 TRANSPORT_L3 | This identifies the transport layer L2 or L3 over which the command needs to be sent to remote MIHF entity. This is valid only for remote commands. |
| ResourceStatus | | Specifies whether requested resources are available or not at the new PoA. |
| QueryResourceList | | List of resources actually available at the new suggested network and the new network PoA. |

3) IP_Information.request

This primitive, which is an MIH signaling message between points of attachment (broadband wireless access network base station, wireless LAN AP, or cellular system base station), is transmitted to a new PoA by an old PoA of a mobile subscriber station to request access router address information (e.g., informations included in Router Advertisement) or FA (foreign agent) address information (e.g., informations included in Agent Advertisement). In case that an old PoA has information to reach an access router connected to a new PoA to which a specific mobile subscriber station is going to move or a foreign agent, the old PoA can directly transmit this message to the access router or the foreign agent.

And, the old PoA can inform the new PoA that the specific mobile subscriber station is going to hand over to the new PoA via this message.

Moreover, the PoA or an MIH of the foreign agent, which has received this primitive, can trigger it to an upper layer.

Table 10 shows an example of a data format of IP_Information.request primitive. And, a mobile subscriber station can make a request for this primitive from a new PoA.

TABLE 10

| Name | Type | Description |
|---|---|---|
| EventSource | EVENT_LAYER_TYPE | Source from which event is generated |
| EventDestination | EVENT_LAYER_TYPE | Destination to which event shall be delivered |
| MacMobileTerminal | MAC Address | MAC address of MSS |
| MacAccessRouter | MAC Address | MAC address of access router |
| New PoA MAC Address | MAC Address | MAC address of new PoA |
| Home Address | IP Address | Home Address of MSS |
| CoA | IP Address | Temporary IP address currently used by MSS |

TABLE 10-continued

| Name | Type | Description |
|---|---|---|
| Old FA Address | IP Address | This parameter is included in case of MIPv4. IP address of old FA |
| Old Access Address | Router IP Address | This parameter is included in case of MIPv6. IP address of old Access Router |

4) IP_Information.confirm

This primitive, which is an MIH signaling message between points of attachment (broadband wireless access network base station, wireless LAN AP, or cellular system base station), is transmitted to make a response to a result of new IP_Information.request of a mobile subscriber station.

This primitive is transmitted by including address information (e.g., informations included in Router Advertisement) of an access router requested by IP_Information.request or FA (foreign agent) address information (e.g., informations included in Agent Advertisement).

'TimeStamp' indicates a time of encapsulation to represent reliability of cashed Mobility Agent Advertisement Extension or Router information. This time may indicate a duration time after encapsulation of Agent Advertisement or Router Advertisement. In case that this message is forwarded to a mobility management entity of a mobile subscriber station, the objects of this parameter are to obtain information in a manner that the mobility management entity (e.g., Mobile IPv4, Mobile IPv6, FMIPv6, etc.) of the mobile subscriber station performs decapsulation on Agent Advertisement or Router Advertisement included in the message and to know how long it takes until the information is received. And, a valid actual life time of this message can be calculated by subtracting a time difference represented by 'TimeStamp' from a life time indicating a valid time of this message as a parameter of Agent Advertisement or Router Advertisement.

Example of a data format of IP_Information.confirm primitive.

TABLE 11

| Name | Type | Description |
|---|---|---|
| EventSource | EVENT_LAYER_TYPE | Source from which event is generated |
| EventDestination | EVENT_LAYER_TYPE | Destination to which event shall be delivered |
| MacMobileTerminal Mobility Management Protocol Support Type | MAC Address Bitmap | MAC address of MSS Indicating Mobility Management Protocol Support Type supported by Router 0: MIPv4 with FA (FA-CoA) 1: MIPv4 without FA (Co-located CoA) 2: MIPv6 3: MIPv6 with DHCPv6 4: FMIPv6 5: HMIPv6 6: SIP 7: Reserved |
| IP Address Change Notification | | This field indicates whether a current address needs to be changed when an IP address (including Care of Address) of MSS moves to a new PoA. 0: IP Address Change 1: IP Address No Change |
| FA-CoA or Router Address | | If the Mobility Management Protocol Support type is 0, FA-Address is included. If the Mobility Management Protocol Support type is 2, Router Address is included. Included only if the IP Address Change Notification is 0. |
| Mobility Agent Advertisement Extension | | This parameter is included only if the Mobility Management Protocol Support type is 0 and is the same information of contents included in Agent Advertisement provided by FA. And, this parameter is included only if the IP Address Change Notification is 0. (e.g., CoA information, Registration life time, encapsulation information) |
| Router Information | | This parameter is included only if the Mobility Management Protocol Support type is 2 and is the same information of contents included in Router Advertisement provided by IPv6 Router. And, this parameter is included only if the IP Address Change Notification is 0. (e.g., Router Address, Status preserving type address auto-configuration Router lifetime, etc.) |
| Home Address TimeStamp | IP Address | Home Address of MSS Time information when Mobility Agent Advertisement Extension or Router information (Agent advertisement or Router advertisement) is encapsulated. Time difference between a timing point of receiving |

TABLE 11-continued

| Name | Type | Description |
|------|------|-------------|
|  |  | and storing from Agent or Router and a timing point of encapsulation in this message for transmission. |

5) IP_CoA.request

This primitive is transmitted for an MIH of a new PoA to make a request for address information or 'Agent Advertisement'/'Router Advertisement' message to its access router or FA after having received IP_Information.request.

Table 12 shows an example of a data format of IP_CoA.request.

TABLE 12

| Name | Type | Description |
|------|------|-------------|
| EventSource | EVENT_LAYER_TYPE | Source from which event is generated |
| EventDestination | EVENT_LAYER_TYPE | Destination to which event shall be delivered |
| MacMobileTerminal | MAC Address | MAC address of MSS |
| MacAccessRouter | MAC Address | MAC address of old access router |
| Old FA Address | IP Address | This parameter is included in case of MIPv4 only. IP Address of old FA |
| Old Access Router Address | IP Address | This parameter is included in case of MIPv6 only. |

6) IP_CoA.indication

This primitive is transmitted to its upper layer for an access router or an MIH (media independent handover) of FA to make a request for address information or 'Agent Advertisement'/'Router Advertisement' message to the access router or FA after having received IP_CoA.request. The received IP_CoA.request can be transparently forwarded to the upper layer from the MIH. In this case, this primitive has a same format of the IP_CoA.request.

7) IP_CoA.response

This primitive is transmitted in response to MIH after an access router or an upper layer of FA has received IP_CoA.indication. This primitive includes address information of an access router or FA or 'Agent Advertisement'/'Router Advertisement' message. This parameter has the same format shown in Table 9.

8) IP_CoA.confirm

This primitive is transmitted for an access router or an MIH of FA to forward address information of an access router or FA or 'Agent Advertisement'/'Router Advertisement' message to an MIH of a new PoA. A data format of IP_CoA.confirm can be identical to the format shown in Table 9.

9) New_IP_Address_indication

This MIH event is used in forwarding information (e.g., Agent Advertisement/Router Advertisement message) for a new CoA from an old CoA to an upper layer of a mobile subscriber station. This parameter can have the same format shown in Table 9.

10) IP_CoA_Info.indication

This primitive is used for an old access router of a mobile subscriber station or an MIH of FA to forward IP associated information acquired from a new access router of the mobile subscriber station or the FA to it upper layer. The upper layer provides 'Proxy Router Advertisement' message to the mobile subscriber station after having received this primitive. This parameter can have the same format shown in Table 9.

11) Start_Data_Forwarding

After an old PoA of a mobile subscriber station has been notified by the mobile subscriber station that a new connection was configured, this primitive is used to request an old access router to forward data toward the mobile subscriber station to a new access router.

A new PoA has been notified that a new connection configuration has been completed. And, this is notified to a new access router. In this case, the new access router can request an old access router to forward data toward a mobile subscriber station to the new access router.

In case that a data forwarding request and a data forwarding for the service continuity of a mobile subscriber station proposed via this message of the present invention are carried out between points of attachment, MIH functions of the points of attachment can make the data forwarding request via this message.

Table 13 shows an example of a format of Start_Data_Forwarding.

TABLE 13

| Name | Type | Description |
|------|------|-------------|
| CommandSource | EVENT_LAYER_TYPE | Source from which event is generated |
| CommandDestination | EVENT_LAYER_TYPE | Destination to which event shall be delivered |
| MacMobileTerminal | MAC Address | MAC address of MSS |
| MacOldAccessRouter | MAC Address | MAC address of old access router |
| MacNewAccessRouter | MAC Address | MAC address of new access router |
| NetworkIdentifier | Media Specific | Network Identifier usable in detecting a change of subnet |

12) Start_Data_Transmission

This primitive indicates that a new PoA of a mobile subscriber station informs a new access router that a new link configuration with the mobile subscriber station has been completed and that an access router can forward data to the mobile subscriber station. This parameter can have the same format shown in Table 11.

Parameters added to the conventional

Link_Going_Down and Link_Down to achieve the objects of the present invention are explained as follows.

13) Link_Going_Down

In order to request IP address information of a new PoA from a current PoA after having received Link_Going_Down from its MAC layer, an MIH of a mobile subscriber station includes a MAC address for the new PoA in the Link_Going_Down.

Table 14 shows an example of a data format of Link_Going_Down.

TABLE 14

| Name | Type | Description |
|------|------|-------------|
| EventSource | EVENT_LAYER_TYPE | Source from which event is generated |

TABLE 14-continued

| Name | Type | Description |
|---|---|---|
| EventDestination | EVENT_LAYER_TYPE | Destination to which event shall be delivered |
| MacMobileTerminal | MAC Address | MAC address of MSS |
| MacOldAccessRouter | MAC Address | MAC address of old access router |
| MacNewAccessRouter | MAC Address | MAC address of new access router |
| TimeInterval | Time in msecs | Estimated time for Link_Down of link |
| ConfidenceLevel | % | Estimated level for Link_Down of link in a specific time |
| UniqueEventIdentifier | | Used in case that Event rollback occurs |
| New PoA MAC | MAC Address | MAC address for a new PoA of MSS |

14) Link_Down

By newly adding an IP address of a mobile subscriber station to the related art Link_Down, a link layer of an old PoA of the mobile subscriber station informs an MIH of this. The MIH remotely transmits a remote Link_Down trigger to an access router, FA, a new access router or FA to request that data toward the corresponding mobile subscriber station should be forwarded to the new access router of the mobile subscriber station or the FA.

Table 15 shows an example of a data format of Link_Down.

TABLE 15

| Name | Type | Description |
|---|---|---|
| EventSource | EVENT_LAYER_TYPE | Source from which event is generated |
| EventDestination | EVENT_LAYER_TYPE | Destination to which event shall be delivered |
| MacMobileTerminal | MAC Address | MAC address of MSS |
| MacOldAccessRouter | MAC Address | MAC address of old access router |
| ReasonCode | | Reason why link is released |
| Home Address | IP Address | Home Address of MSS |
| CoA | IP Address | New temporary IP address of MSS |

15) IP_No_Change

After an access router supporting a mobility support protocol (e.g., FMIPv6) has received IP_Information.request from a mobile subscriber station or an old PoA of the mobile subscriber station, if the mobile subscriber station is able to use an old IP address at a new PoA after completion of handover, this primitive is used for the mobile subscriber station to notify it to its MIH.

Table 16 shows an example of a data format of IP_No_Change.

TABLE 16

| Name | Type | Description |
|---|---|---|
| EventSource | EVENT_LAYER_TYPE | Source from which event is generated |
| EventDestination | EVENT_LAYER_TYPE | Destination to which event shall be delivered |
| MacMobileTerminal | MAC Address | MAC address of MSS |

16) Information Elements

Defined in the following description is POA_SUBNET_INFORMATION IE associated with IP address configuration as an information element stored in an information server to be forwarded according to a request made by a mobile subscriber station.

POA_SUBNET_INFORMATION information element is stored in an information server and includes information for all access routers or foreign agents linked to points of attachment (PoAs). In particular, the POA_SUBNET_INFORMATION information element includes mapping information of Layer 2 and Layer 3 addresses.

In case that IPv4 is supported, an information list including an IP address of a foreign agent (FA) capable of communicating with a current PoA can be included. In case that IPv6 is supported, an information list including an IP address of an access router (AR) can be included.

In case of failing in obtain a new IP address using the information (access router address) included in the POA_SUBNET_INFORMATION, a mobile subscriber station can make a direct request for an IP address to a new router using an acquired new access router address information.

Table 17 sows an example of a data format of POA_SUBNET_INFORMATION information element.

TABLE 17

| No. | Name of Information Element | Description | Representation | Length |
|---|---|---|---|---|
| 1 | Type_IE_POA_SUBNET_INFORMATION | Information about subnets supported by PoA | IPv4 supported: List of available FA IP Addresses IPv6 supported: List of available AR IP addresses | Variable |

TABLE 17-continued

| No. | Name of Information Element | Description | Representation | Length |
|---|---|---|---|---|
| 2 | Type_IE_POA_SUBNET_INFORMATION | Information about IP Address Configuration | FA address configuration information AR address configuration information | Variable |

Operations according to the method proposed by the present invention will be explained in the following description for a case of handover using Mobile IPv4 and cases of using Mobile IPv6 or FMIPv6 in handover similar to the former case.

Figure 9:
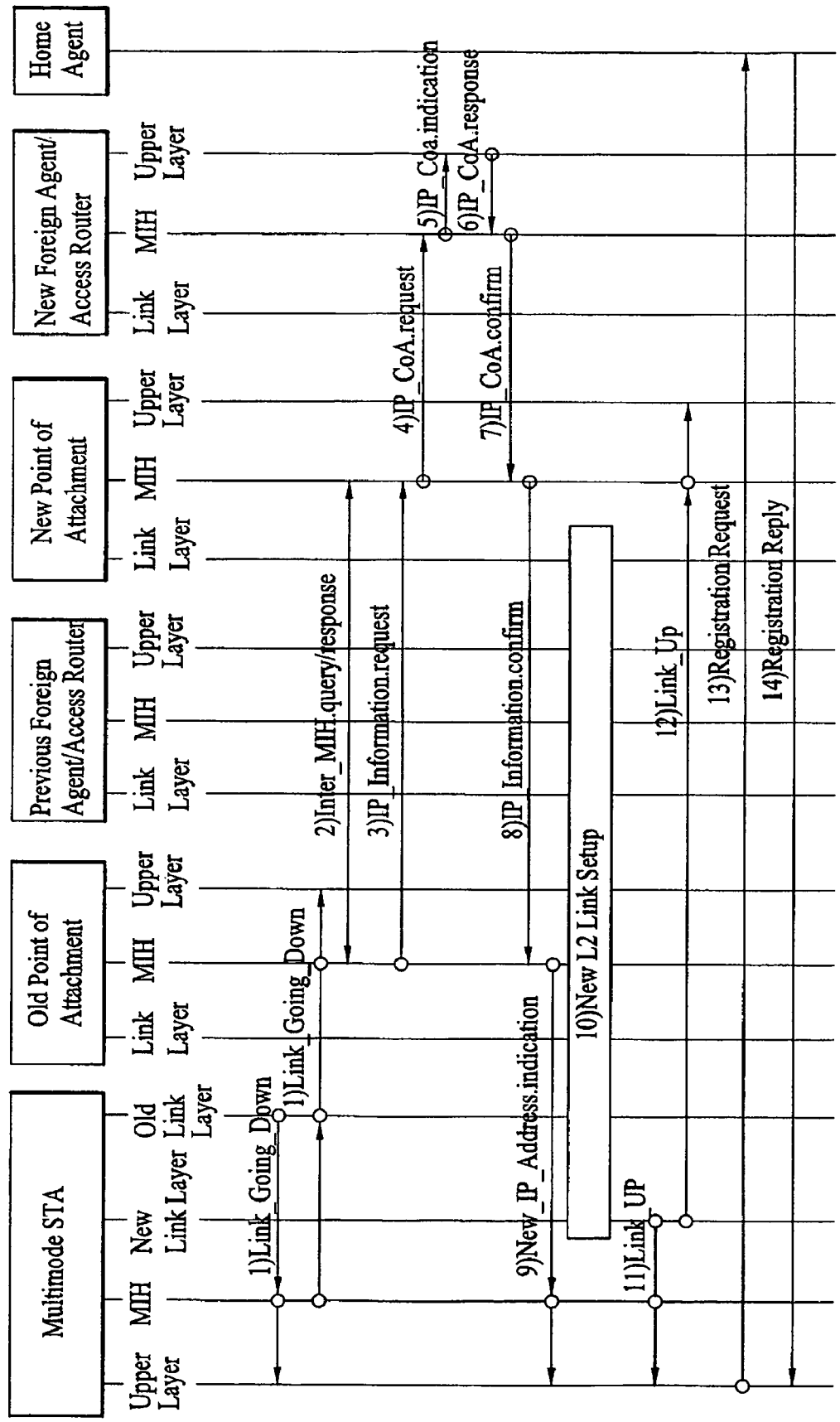
FIG. 9 is a flowchart according to one preferred embodiment of the present invention.

FIG. 9 is a flowchart according to one preferred embodiment of the present invention.

In case that a mobile subscriber station uses MIPv4 or MIPv6 as a mobility support protocol and FA-CoA or non-status type address information as a care of address (CoA) and if an FA-CoA or a non-status type address for a new PoA is allocated from an old PoA in making a handover to the new PoA, a MAC address for the new PoA is acquired by an information service. In the description of the present invention, the term 'old' can be interchangeably used with terms 'source' and/or 'previous.'

1) If a quality of signal is degraded, a previous link of a mobile subscriber station transmits Link_Going_Down to an upper layer including an upper management entity via MIH and also transmits Remote_Link_Going_Down including an address of a new PoA to an old/previous PoA to an old PoA. In this case, an MIH of the mobile subscriber station triggers to forward IP_Information.request to the old PoA instead of forwarding the Remote_Link_Going_Down. The MIH obtains information for an available link layer by previously instructing periodic scans to lower link layers and is instructed of a list of candidate link layers by the upper management entity to maintain corresponding information.

2) An MIH of the old PoA obtains a presence or non-presence of a CoA (Care of Address) change by exchanging Inter_MIH.query and Inter_MIH.response with an MIH of the new PoA. Moreover, the MIH of the old PoA plays a role in previously notifying the new PoA that a specific mobile subscriber station is going to initiate a handover to the new PoA through this message exchange. So, the new PoA obtains additional information necessary for the handover of the specific mobile subscriber station by requesting the information from the old PoA. Through this process, a source network including the old POA and a target network including the new POA can both establish handover management modules, which can include any one of a network handover module (e.g., MIH), a mobility management module/entity, a user plane module/entity (UPE), a mobile internet protocol foreign agent, and an access router. Here, the source network can further include old/previous foreign agent/access router while the target network can further include new foreign agent/access router. The terms used above is not limited to the description with respect to FIG. 9 but also can be used through the description of the present invention.

3) The MIH of the old PoA makes a request in a form of a message for access router address information of the new PoA or FA (foreign agent)/access router address information by transmitting IP_Information.request to the MIH of the new PoA. In other words, the handover management module of the source network sends a request message for handover to the handover management module of the target network. If the mobile subscriber station knows an access router or FA (foreign agent) to be accessed by handover, the old PoA directly transmits IP_Information.request to the access router or the FA.

4) Having received the IP_Information.request, the MIH of the new PoA transmits IP_CoA.request to its access router or an MIH of the FA. In case that the MIH of the old PoA directly transmits the IP_Information.request to the access router or the MIH of the FA, the present procedure is omitted.

5) The access router or the MIH of the FA transmits IP_CoA.indication to its upper layer. This primitive has the same format of IP_Information.request or IP_CoA.request if the IP_Information.request or IP_CoA.request is transparently delivered to the upper layer.

6) The access router or the upper layer of the FA makes a response of IP_CoA.response containing address information or 'Agent Advertisement/Router Advertisement' message.

7) The access router or the MIH of the FA makes a response of IP_CoA.confirm containing address information or 'Agent Advertisement/Router Advertisement' message to the MIH of the new PoA.

8) The MIH of the new PoA responds by sending an IP_Information.confirm message including IP address information to the MIH of the old PoA. To put differently, the handover management module of the target network sends a response message to the request message regarding handover to the handover management module of the source network.

9) The MIH of the old PoA triggers New_IP_Address.indication including IP address information to the MIH or upper layer of the mobile subscriber station. That is, the handover management module of the source network sends a confirmation message for handover, which includes internet protocol address information, to the mobile terminal/mobile subscriber station.

10) Layer 2 (L2) link with the new PoA is established.

11)~12) A new link of the mobile subscriber station triggers Link_Up to the upper layer including the upper management entity and also triggers Remote_Link_Up to the MIH of the new PoA. In this case, if the new PoA itself recognizes that a new connection is configured via its MAC layer, a MAC layer of the new PoA can trigger this to the MIH in direct.

13) The upper layer of the mobile subscriber station transmits a registration request message to a home agent.

14) The home agent makes a response of 'Registration Response' to the upper layer of the mobile subscriber station.

Figure 10:
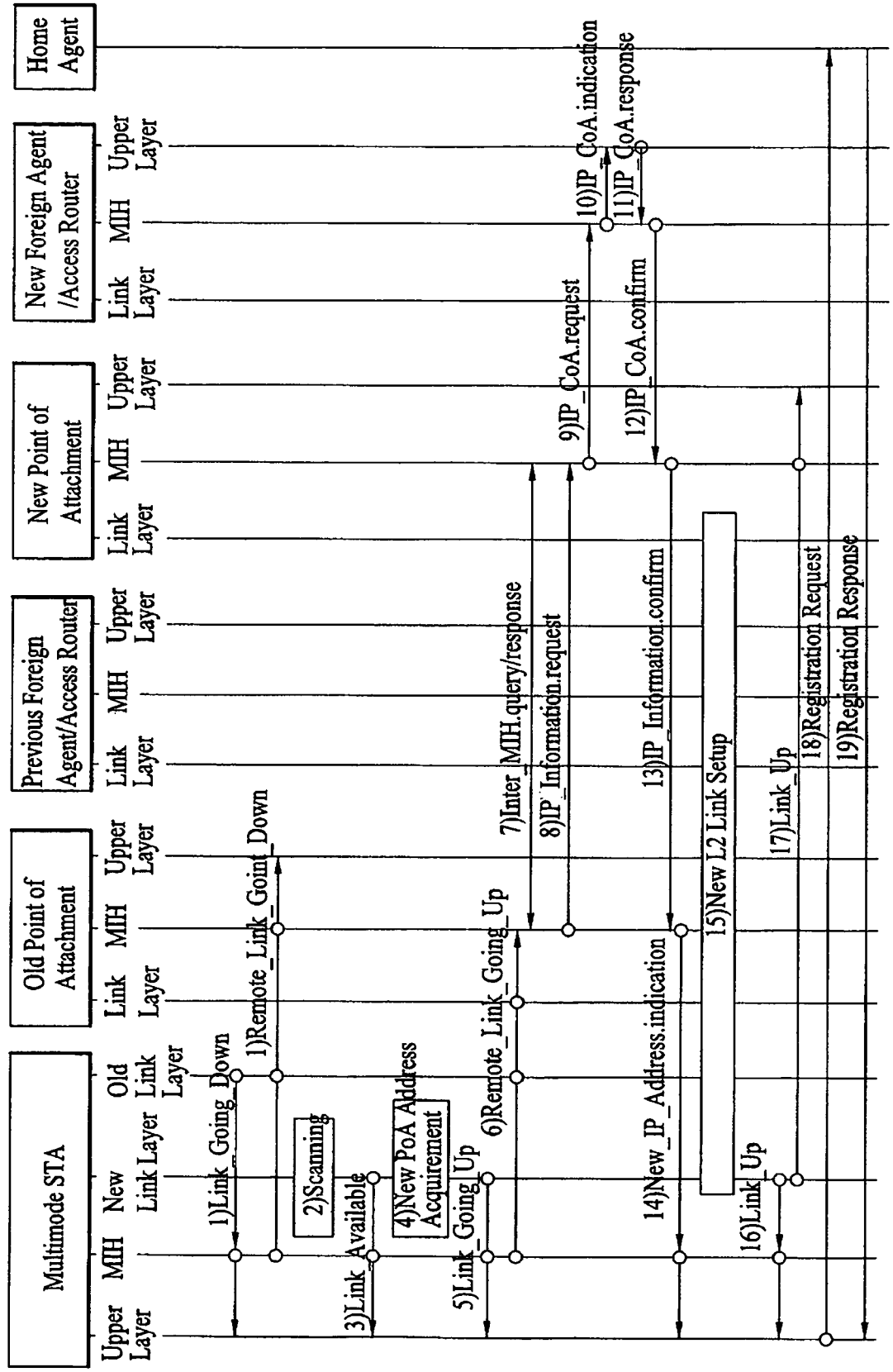
FIG. 10 is a flowchart according to another preferred embodiment of the present invention.

FIG. 10 is a flowchart according to another preferred embodiment of the present invention.

In case that a mobile subscriber station uses MIPv4 or MIPv6 as a mobility support protocol and FA-CoA or non-status type address information as a care of address (CoA) and if an FA-CoA or a non-status type address for a new PoA is allocated from an old PoA in making a handover to the new PoA, a MAC address for the new PoA is not acquired by an information service.

1) If a quality of signal is degraded, a previous link of a mobile subscriber station transmits Link_Going_Down to an upper layer including an upper management entity via MIH and also transmits Remote_Link_Going_Down to an old PoA.

2) The mobile subscriber station searches available links by executing a scanning process.

3) If a new link is discovered as a result of the scanning process, Link_Available is triggered to the upper layer including the upper management entity via the MIH.

4) A new link layer of the mobile subscriber station obtains a MAC address for a new PoA through a MAC configuration procedure.

5)~6) The new link layer of the mobile subscriber station triggers Link_Going_Up to its upper management entity and also triggers Remote_Link_Going_Up including a MAC address of a new PoA to an MIH of the old PoA. In this case, the MIH of the mobile subscriber station can trigger (forward) IP_Information.request to the old PoA instead of triggering the Remote_Link_Going_Up.

7) The MIH of the old PoA obtains a presence or non-presence of a CoA (care of address) change by exchanging Inter_MIH.query and Inter_MIH.response with an MIH of the new PoA. And, the MIH of the old PoA plays a role in previously notifying the new PoA that a specific mobile subscriber station is going to initiate a handover to the new PoA through this message exchange. So, the new PoA obtains additional information necessary for the handover of the specific mobile subscriber station by requesting the information from the old PoA.

8) The MIH of the old PoA makes a request for access router address information of the new PoA or FA (foreign agent) address information by transmitting IP_Information.request to the MIH of the new PoA. If the mobile subscriber station knows an access router or FA (foreign agent) to be accessed by handover, the old PoA directly transmits IP_Information.request to the access router or the FA.

9) Having received the IP_Information.request, the MIH of the new PoA transmits IP_CoA.request to its access router or an MIH of the FA. In case that the MIH of the old PoA directly transmits the IP_Information.request to the access router or the MIH of the FA, the present procedure is omitted.

10) The access router or the MIH of the FA transmits IP_CoA.indication to its upper layer. This primitive has the same format of IP_Information.request or IP_CoA.request if the IP_Information.request or IP_CoA.request is transparently delivered to the upper layer.

11) The access router or the upper layer of the FA makes a response of IP_CoA.response containing address information or 'Agent Advertisement/Router Advertisement' message.

12) The access router or the MIH of the FA makes a response of IP_CoA.confirm containing address information or 'Agent Advertisement/Router Advertisement' message to the MIH of the new PoA.

13) The MIH of the new PoA makes a response of IP_Information.confirm including IP address information to the MIH of the old PoA.

14) The MIH of the old PoA triggers New_IP_Address.indication including IP address information to the MIH or upper layer of the mobile subscriber station.

15) Layer 2 (L2) link with the new PoA is established.

16)~17) A new link of the mobile subscriber station triggers Link_Up to the upper layer including the upper management entity and also triggers Remote_Link_Up to the MIH of the new PoA.

18) The upper layer of the mobile subscriber station transmits a registration request message to a home agent.

19) The home agent makes a response of 'Registration Response'.

Figure 11:
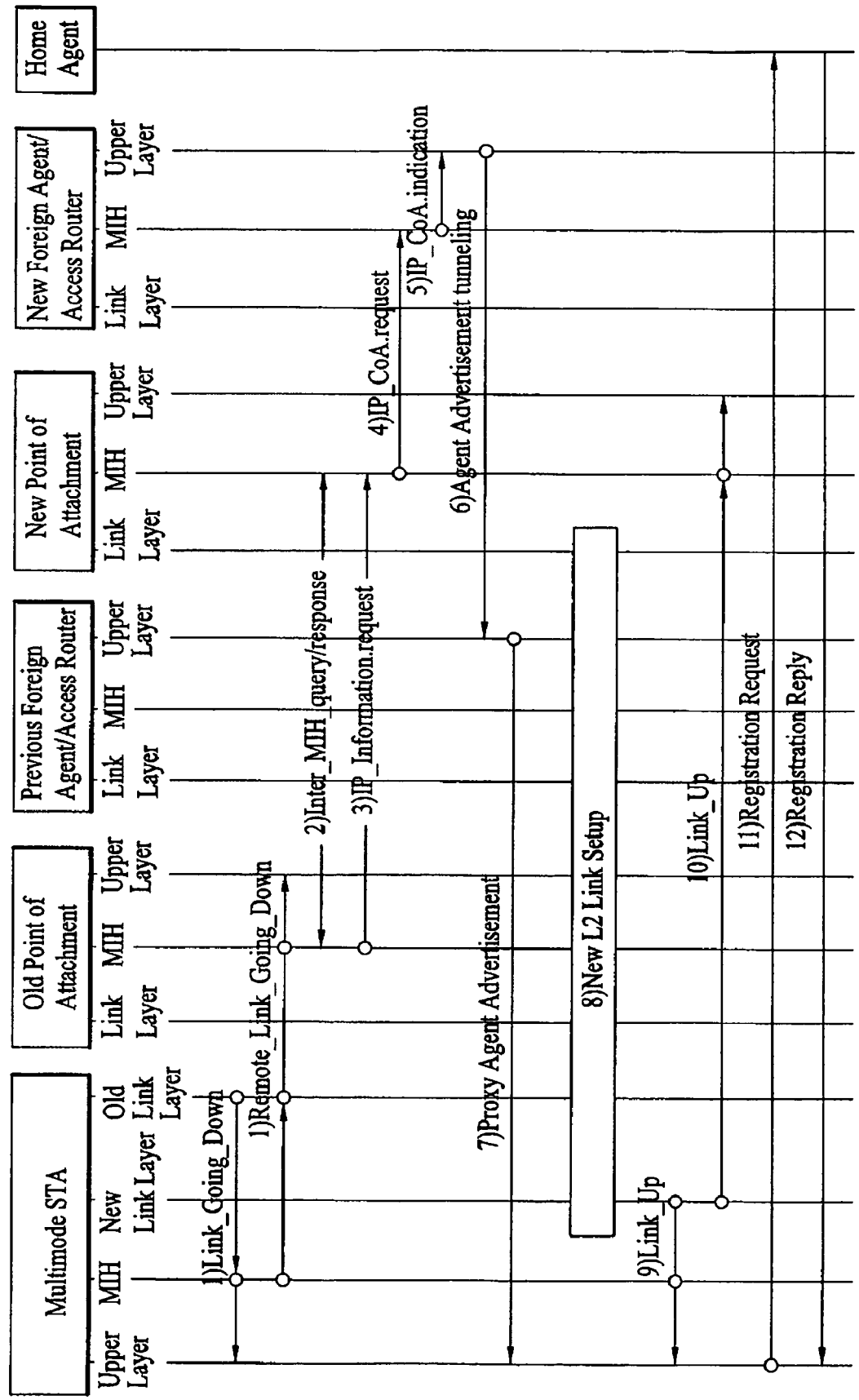
FIG. 11 is a flowchart according to another preferred embodiment of the present invention.

FIG. 11 is a flowchart according to another preferred embodiment of the present invention.

In case that a mobile subscriber station uses MIPv4 or MIPv6 as a mobility support protocol and an FA-CoA or non-status type address information as a care of address (CoA), an FA-CoA or a non-status type address for a new PoA is allocated from an old PoA in making a handover to the new PoA.

Referring to FIG. 11, in a new foreign agent or new access router (5) to which it is notified that a specific mobile subscriber station is going to hand over, the new foreign agent transmits (7) 'Agent Advertisement' to the mobile subscriber station by tunneling (6) via an old foreign agent. And, the new access router transmits (7) 'Router Advertisement' to the mobile subscriber station by tunneling (7) via an old access router. In doing so, the old foreign agent or the old access router provides it to the mobile subscriber station through de-tunneling.

In the step (7), 'Proxy Agent/Router Advertisement' is represented since the old foreign agent or the old access router relays the forwarded 'Agent Advertisement' or 'Router Advertisement' instead of transmitting its 'Agent Advertisement' or 'Router Advertisement'.

And, the rest of the steps of the present embodiment are similar to those explained in the embodiment shown in FIG. 9.

Figure 12:
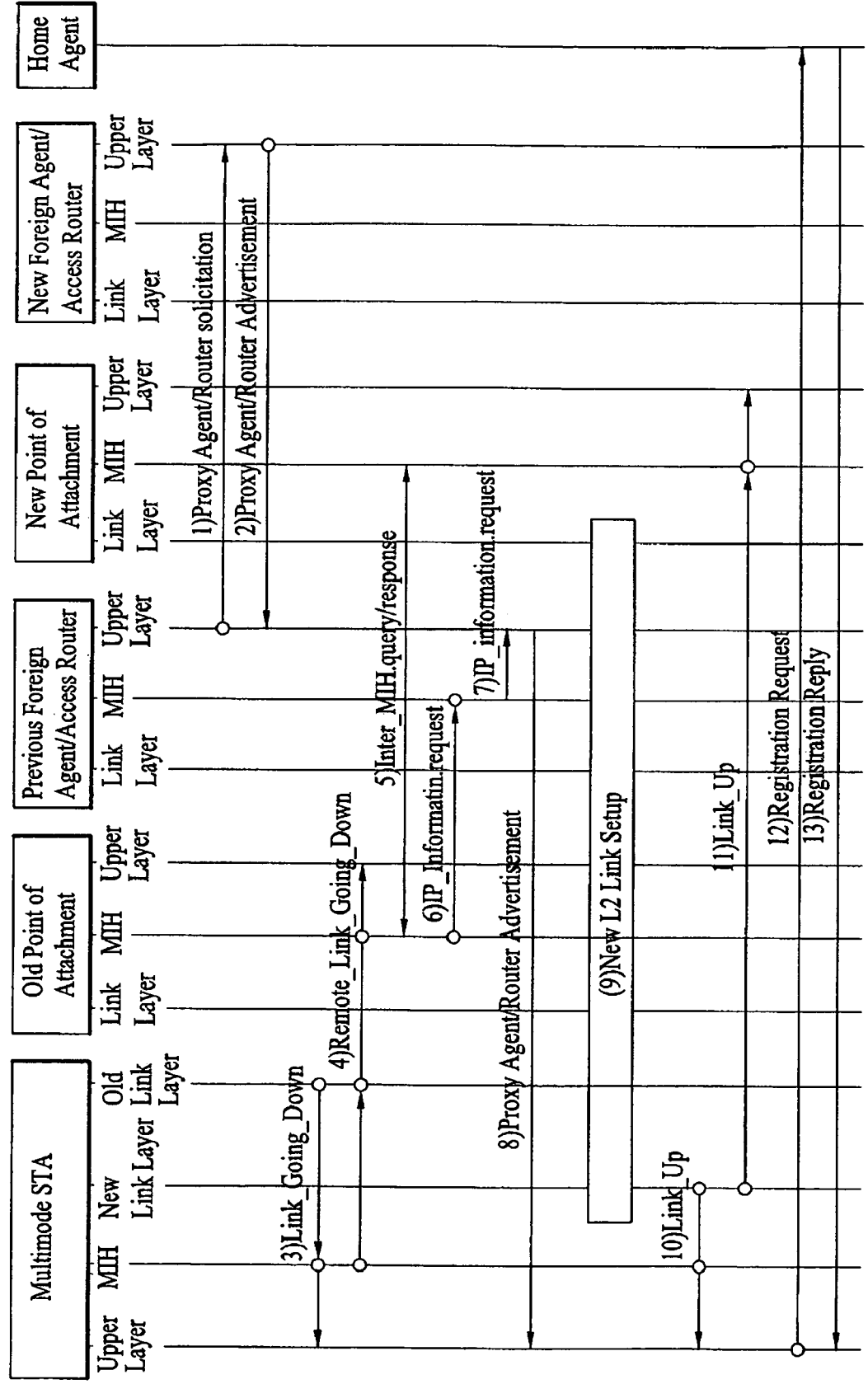
FIG. 12 is a flowchart according to another preferred embodiment of the present invention.

FIG. 12 is a flowchart according to another preferred embodiment of the present invention.

In case that a mobile subscriber station uses MIPv4 or MIPv6 as a mobility support protocol and an FA-CoA or non-status type address information as a care of address (CoA), an FA-CoA or a non-status type address for a new PoA is allocated from an old PoA in making a handover to the new PoA.

Referring to FIG. 12, an old foreign agent or an old access router receives and maintains informations of neighbor foreign agents or access routers (1), (2). The information maintenance can be periodically performed for itself or can be non-periodically performed according to a request.

Steps (3), (4) and (5) are similar to the steps (1) and (2) shown in FIG. 9. And, an MIH of a mobile subscriber station can trigger (forward) IP_Information.request instead of triggering Remote_Link_Going_Down.

An MIH of an old PoA transmits IP_Information.request to an MIH of the old foreign agent or access router to request access router address information or FA (foreign agent) address information of a new PoA to which a specific mobile subscriber station is going to move to be connected (6).

A corresponding primitive is delivered to an upper layer from the MIH. In this case, the primitive can be transparently delivered (7). Alternatively, the primitive can be transformed to be delivered (7).

If the requested access router address information or the FA address information of the new PoA exists in the information list maintained by the old foreign agent or access router, the existing information is delivered to the mobile subscriber station (8).

And, the rest of the steps of the present embodiment are similar to those explained in the embodiment shown in FIG. 9.

Figure 13:
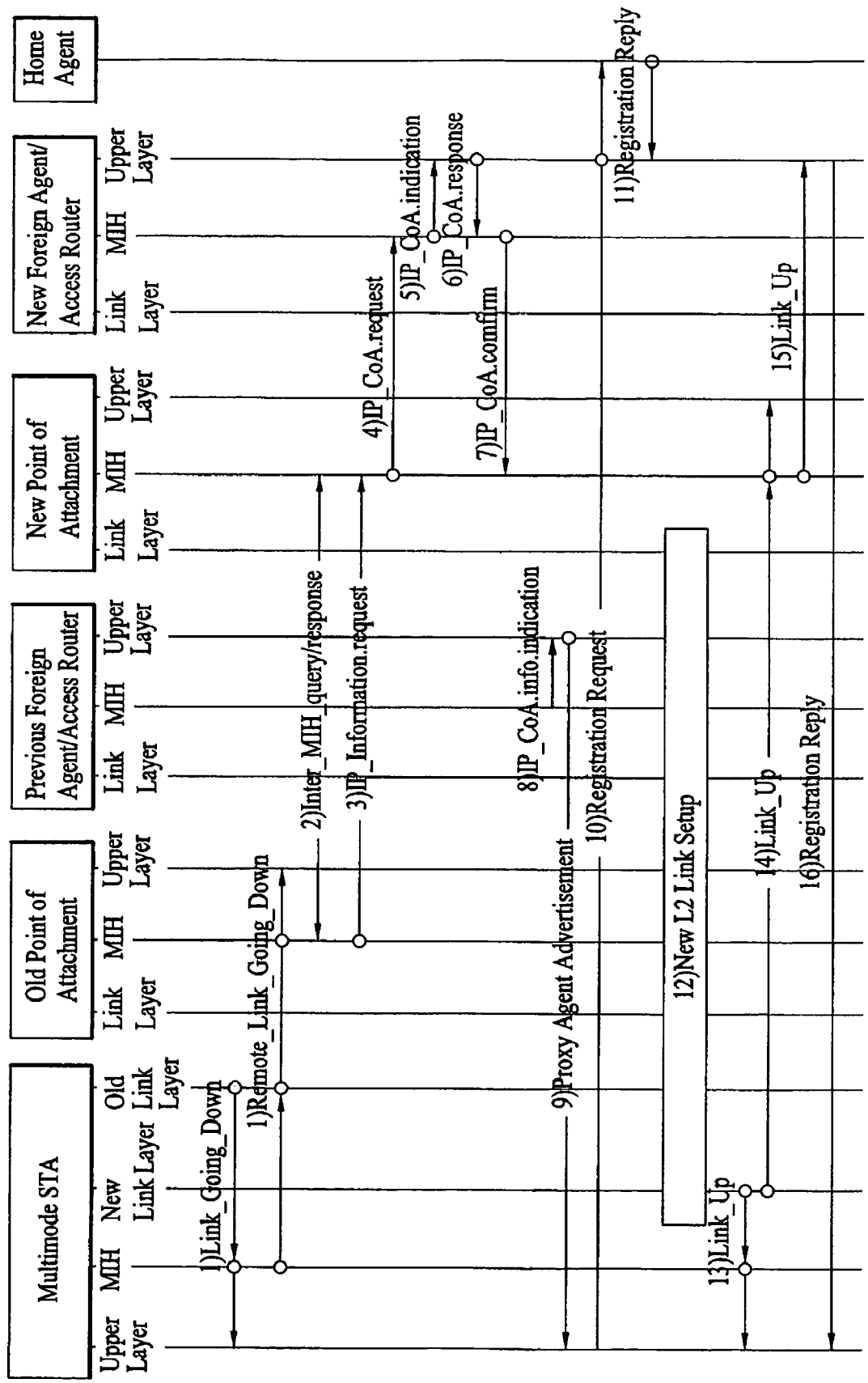
FIG. 13 is a flowchart according to another preferred embodiment of the present invention.

FIG. 13 is a flowchart according to another preferred embodiment of the present invention.

In case that a mobile subscriber station uses MIPv4 or MIPv6 as a mobility support protocol and an FA-CoA or non-status type address information as a care of address (CoA), an FA-CoA or a non-status type address for a new PoA is allocated from an old PoA in making a handover to the new PoA.

Referring to FIG. 13, an MIH of an old foreign agent or access router transmits a primitive requesting that the delivered address information of a foreign agent or access router of a new PoA should be transmitted to an upper layer of the old foreign agent or access router (8).

The upper layer having received the primitive transmits the delivered information to a mobile subscriber station (9).

In case that a connection between the mobile subscriber station and an old link is still maintained, the mobile subscriber station transmits 'Registration Request' for a registration to a home agent via the old link (10).

The registration request message transmitted to the home agent is relayed via a new foreign agent. The home agent transmits a response message for approving the registration of the mobile subscriber station to the new foreign agent. Having received the response message, the new foreign agent keeps it until Link_Up is triggered from a PoA instead of forwarding it to the mobile subscriber station immediately (11).

The mobile subscriber station performs a new link configuration procedure. Once this link is configured, the mobile subscriber station is notified of the completion of the new link (13) and informs it to a new PoA (Remote) as well (14). In case that the new PoA manages a link status with the mobile subscriber station for itself. In this case, a procedure of notifying the link configuration to 'Remote' can be omitted.

When Link_Up is delivered to an MIH and upper layer of the new PoA, a discriminator of the mobile subscriber station is transmitted together to indicate what mobile subscriber station is linked up. The MIH of the new PoA notifies the new foreign agent or access router that the link of the mobile subscriber station has been configured (15).

Since the new foreign agent or access router is notified that the link configuration of the specific mobile subscriber station has been completed, the new foreign agent or access router sends 'Registration Reply' indicating that the registration procedure sent to the home agent by the corresponding mobile subscriber station via the old link has succeeded (16). 'Registration Reply' is forwarded by the home agent. The foreign agent or access router plays a role in transmitting it together with the notification of Link_Up instead of processing it.

And, the rest of the steps of the present embodiment are similar to those explained in the embodiment shown in FIG. 9.

Figure 14:
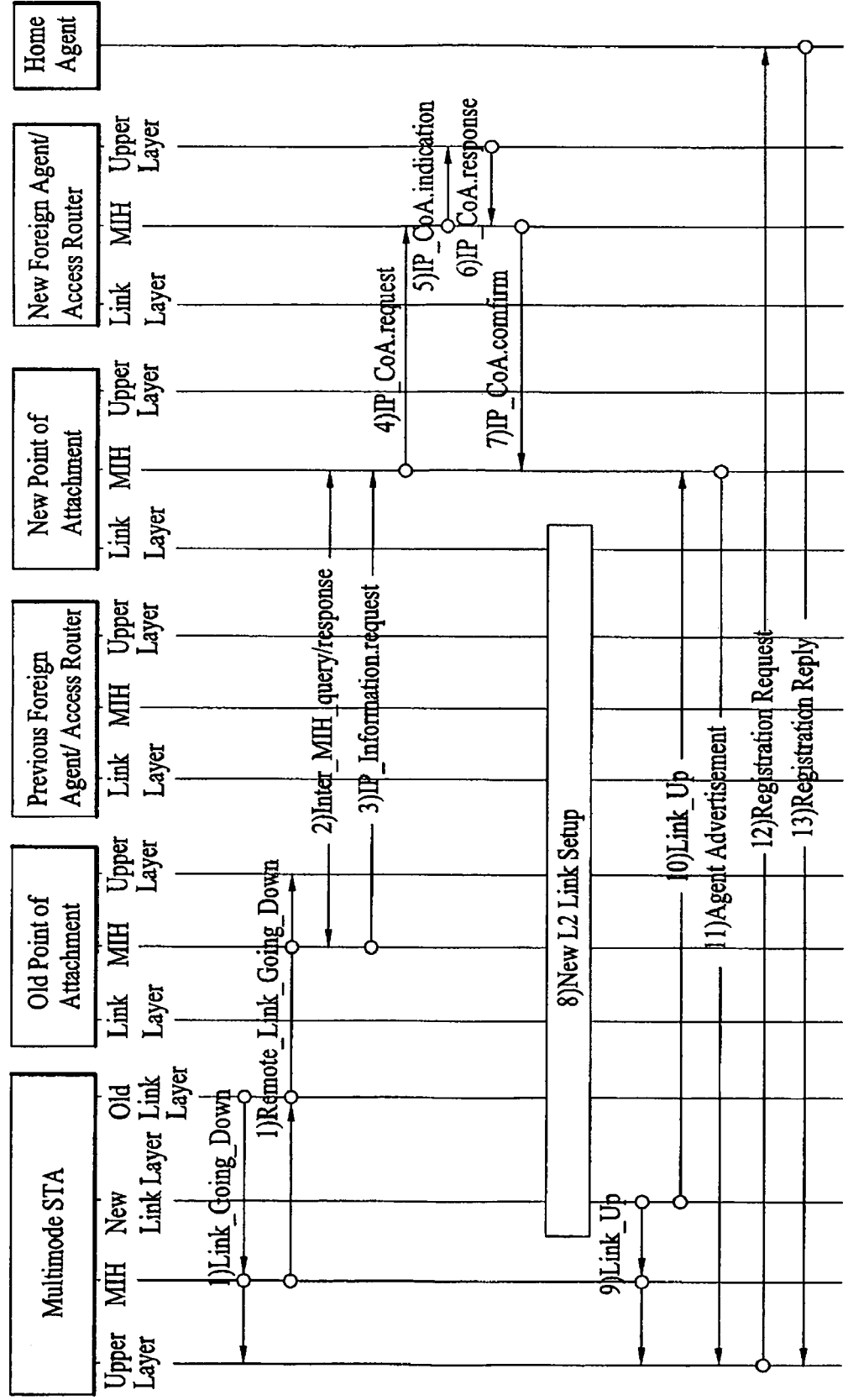
FIG. 14 is a flowchart according to another preferred embodiment of the present invention.

FIG. 14 is a flowchart according to another preferred embodiment of the present invention.

In case that a mobile subscriber station uses MIPv4 or MIPv6 as a mobility support protocol and an FA-CoA or non-status type address information as a care of address (CoA), an FA-CoA or a non-status type address for a new PoA is allocated from an old PoA in making a handover to the new PoA.

Referring to FIG. 14, in case that address information is unable to be forwarded to a mobile subscriber station due to such a reason that a link is released from an old PoA and the like, as soon as a link with a new PoA is configured (10), the new PoA transmits the address information (Agent Advertisement or Router Advertisement) received and kept by the new PoA (11). In this case, link configuration information can be directly notified to its MIH in case that a link layer of the new PoA recognizes a new connection for itself.

And, the rest of the steps of the present embodiment are similar to those explained in the embodiment shown in FIG. 9.

Figure 15:
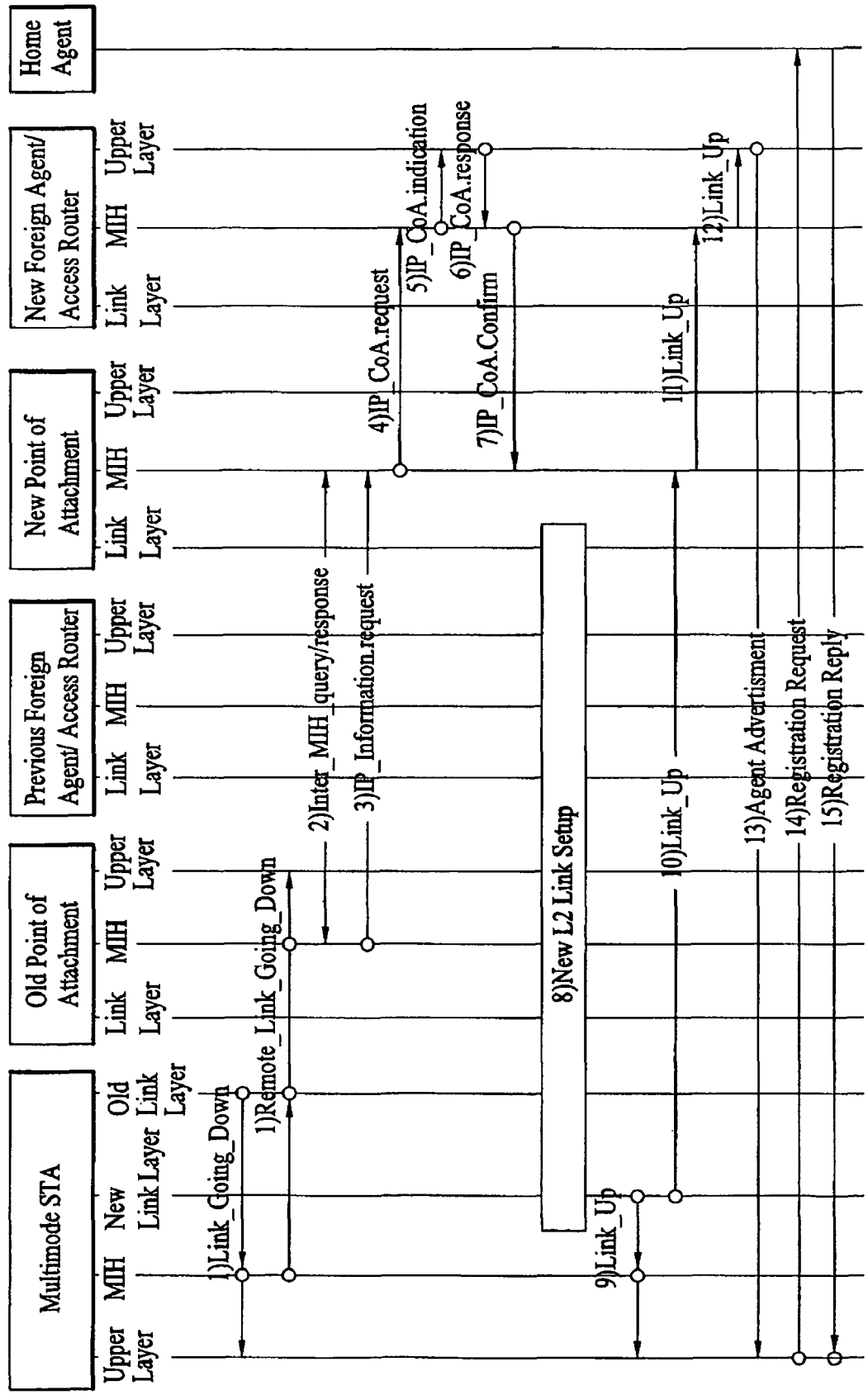
FIG. 15 is a flowchart according to another preferred embodiment of the present invention.

FIG. 15 is a flowchart according to another preferred embodiment of the present invention.

In case that a mobile subscriber station uses MIPv4 or MIPv6 as a mobility support protocol and an FA-CoA or non-status type address information as a care of address (CoA), an FA-CoA or a non-status type address for a new PoA is allocated from an old PoA in making a handover to the new PoA.

Referring to FIG. 15, in case that address information is unable to be forwarded to a mobile subscriber station due to such a reason that a link is released from an old PoA and the like, a new PoA notifies a new foreign agent or access router that a link with the new PoA has been configured (10), (11) and (12). As son as the link of the new PoA of the mobile subscriber station is configured, the new foreign agent or access router transmits the address information (Agent Advertisement or Router Advertisement) (13).

And, the rest of the steps of the present embodiment are similar to those explained in the embodiment shown in FIG. 9.

Figure 16:
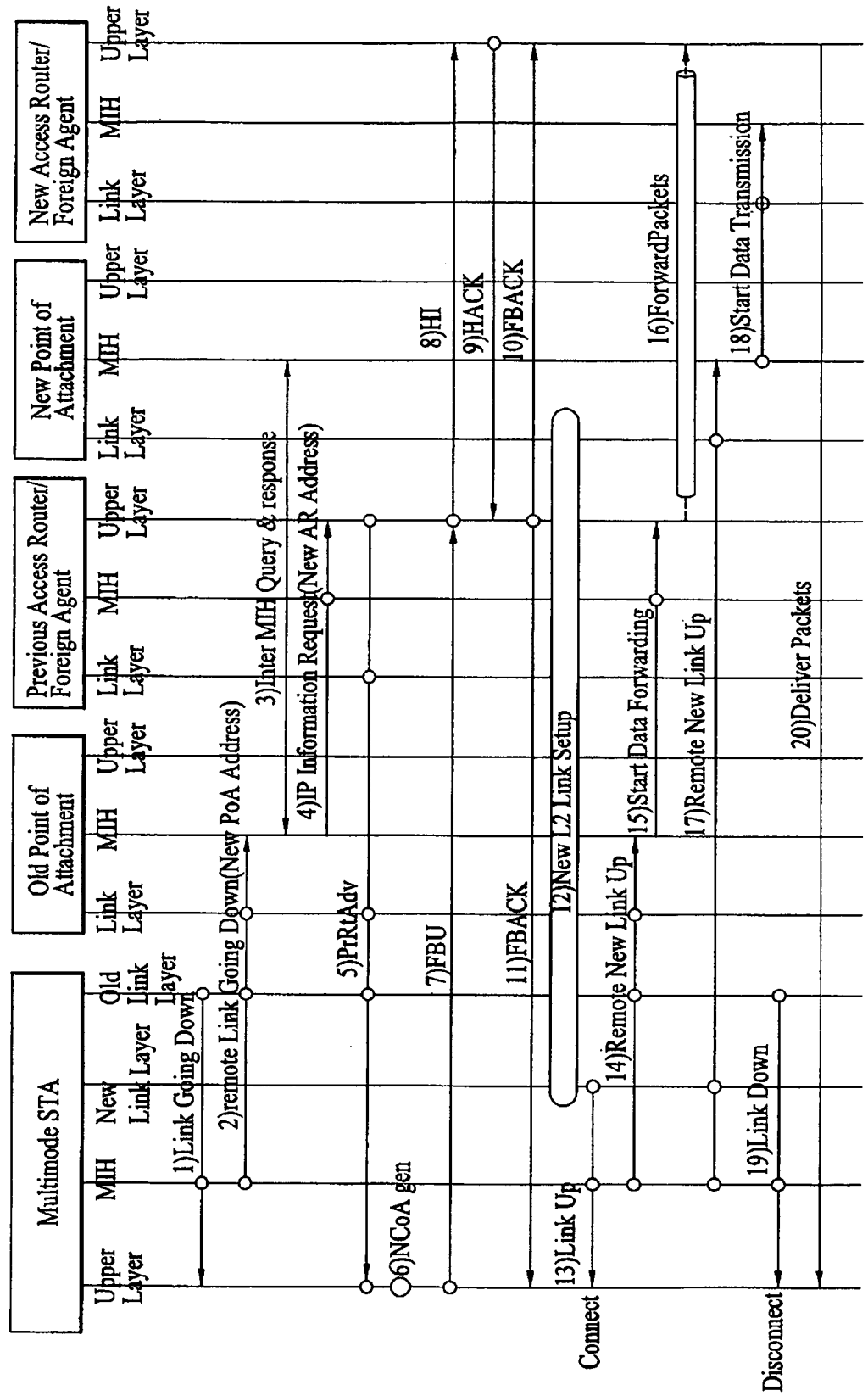
FIG. 16 is a flowchart according to another preferred embodiment of the present invention.

FIG. 16 is a flowchart according to another preferred embodiment of the present invention, in which FMIPv6 is used (in transmitting Link_Going_Down, a PoA address of another type interface to hand over is already known).

(1) It is discovered that a status of a currently accessed link is going down. And, a Link_Going_Down trigger is transmitted to an MIH and an upper layer that need this information.

(2) The information indicating that the link is going down is transmitted to an MIH layer of a currently accessed PoA as well. The information transmission can be performed using Layer 2 via the currently accessed link or using Layer 3 or higher. The information contains an address of a PoA (point of attachment) to be newly accessed. The address of the new PoA can be obtained in advance via an information service or a neighbor broadcast. The MIH obtains information for an available link layer by previously instructing lower link layers to conduct periodic scans, respectively and is instructed of a list of candidate link layers by an upper management entity to maintain corresponding information.

(3) The MIH of the currently accessed POA obtains network situation information of the new PoA by exchanging information (Inter MIH Query & Response) with an MIH of a new PoA using the address of the new PoA carried by Link_Going_Down. In this case, the MIH of the mobile subscriber station can transmit IP_Information.request to the current PoA instead of transmitting Link_Going_Down (unnecessary to change an IP address). New network situation information offers a type of a mobility management protocol used by a PoA to be newly accessed by the mobile subscriber station and information according to the mobility management protocol in case of the same mobility management protocol, e.g., information indicating whether an FA is identical to that of a current PoA in case of MIPv4 and information indicating whether an access router connected to a current PoA is identical to that of a new PoA, etc. In this case, information of an access router connected to the new PoA can be obtained as well. The MIH of the currently accessed PoA plays a role in notifying the new PoA in advance that a specific mobile subscriber station is going to initiate a handover to the new PoA through this message exchange. So, the new PoA requests to obtain additional information necessary for the handover of the specific mobile subscriber station from an old PoA.

(4) The access router of the current PoA is informed that the specific mobile subscriber station is going to move to an access router connected to the new PoA using IP Information request. This has the same effect of transmitting RtSolPr (router solicitation proxy) from the mobile subscriber station in FMIPv6. Yet, since the network conducts a trigger rather than the mobile subscriber station obtained a presence or non-presence of its migration to transmit RtSolPr, there is an effect that a message for sending RtSolPr from the mobile subscriber station can be omitted.

(5) The currently accessed access router transmits PrRtrAdv (Proxy router advertisement) for the access router of the new PoA by the trigger sent from the MIH. Through this, PrRtrAdv can be transmitted faster than RtSolPr of the mobile subscriber station.

(6) A multi-mode mobile subscriber station configures a new 'Care of Address (CoA)' that can be used by the new access router connected to the new PoA via the transmitted PrRtrAdv.

(7), (8), (9), (10), (11) The multi-mode mobile subscriber station and the access router perform a procedure for FMIPv6.

(12) A link equal to or lower than Layer 2 with a new link is configured.

(13) It is sent to an upper layer via MIH that L3 packet can be sent because of the completion of the configuration with the new link. If this trigger is delivered, a mobility management entity immediately transmits FNA (fast neighbor advertisement). A new access router having received the FNA transmits the delivered packet to the mobile subscriber station.

(14) The MIH of the old PoA is informed that the link with the new PoA was configured as soon as the execution of the step (13).

(15) The MIH of the access router triggers that the MIH having recognized that the configuration with the new PoA was completed should forward data to the access router connected to the new PoA. Through this, it can be exactly known when an old access router will forward the data. An effect of the present invention lies in that the MIH of the access router instructs the forwarding of the data by knowing an accurate timing point by the mutual communications between the MIH of the old PoA and the MIH of the access router. And, the accurate timing point may differ from that shown in the present embodiment.

(16) Data is forwarded to the new access router of the new PoA from the old access router of the old PoA.

(17) A remote trigger indicating that the new link was configured is forwarded to an MIH of the PoA of the new link. This step takes place at a timing point similar to that of the step (13). In this case, if recognizing the new link configuration for itself, a link layer of the new PoA can directly informs its MIH of the new link configuration.

(18) The MIH of the new PoA informs an MIH of an access router connected to the new PoA that data can be transmitted due to the configuration of a new link of a mobile subscriber station via communications with the MIH of the access router.

(19) It is informed that an old link has been released. This step can be carried out by a command of MIH after the configuration of the new link is terminated. Alternatively, this step takes place right after the new link configuration but can be maintained for a predetermined time for the duplexing with the new link.

(20) The access router of the new PoA triggered by the step (18) quickly transmits data to the mobile subscriber station without a delay.

Figure 17:
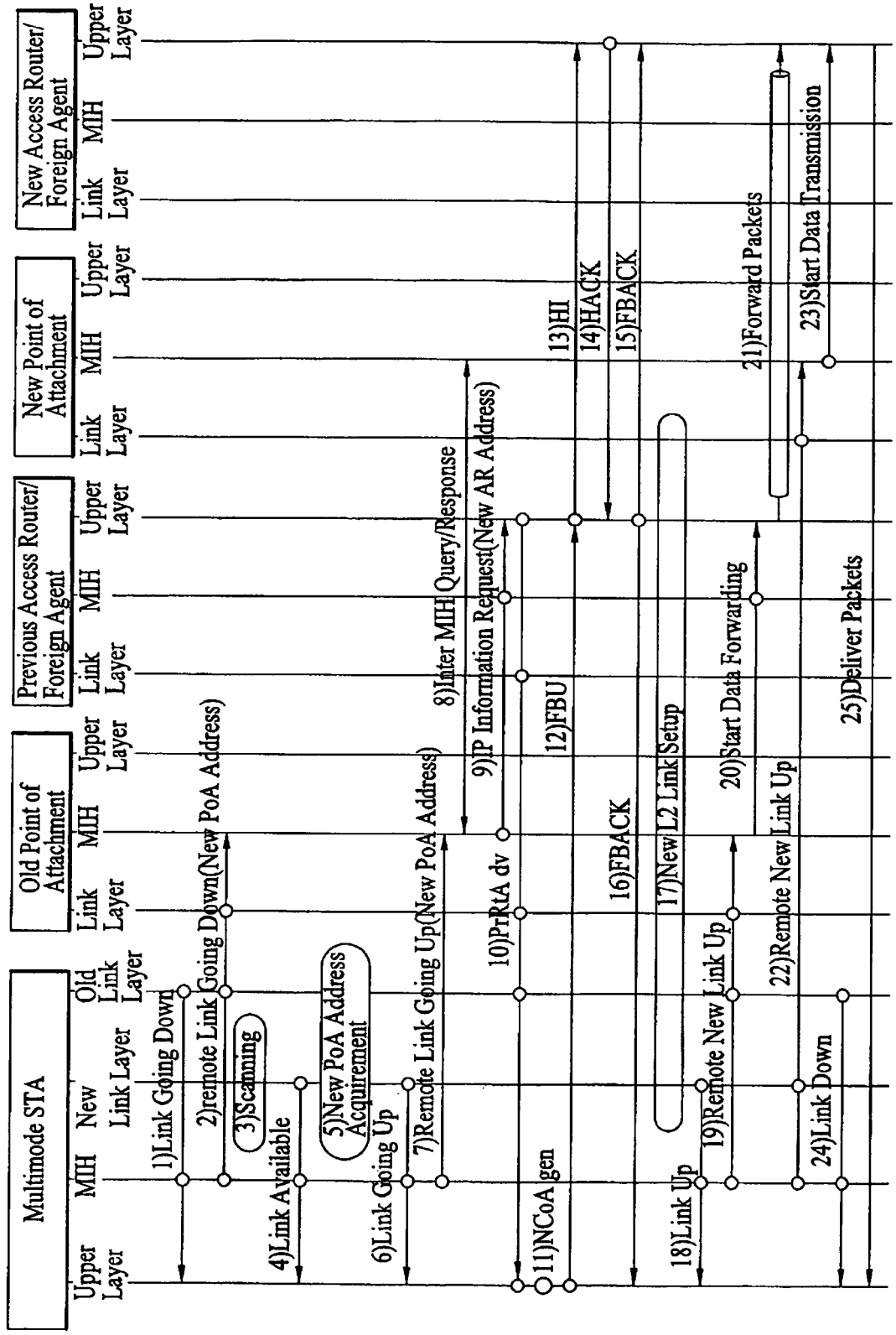
FIG. 17 is a flowchart according to another preferred embodiment of the present invention.

FIG. 17 is a flowchart according to another preferred embodiment of the present invention, in which FMIPv6 is used (in transmitting Link_Going_Up, a PoA address of another type interface to hand over is obtained).

Referring to FIG. 17, different from a case that a PoA address of another type interface to make a handover is already known in transmitting Link_Going_Down in case of using FMIPv6, the present embodiment corresponds to a case that an address of a new PoA is known in the course of a network search of a new PoA or a link configuring procedure with a new PoA without knowing this information in 'Link Going Down' (5).

An MIH of an old PoA is notified that a link will be configured remotely (7).

And, the rest steps are similar to those of the former embodiment shown in FIG. 16.

Figure 18:
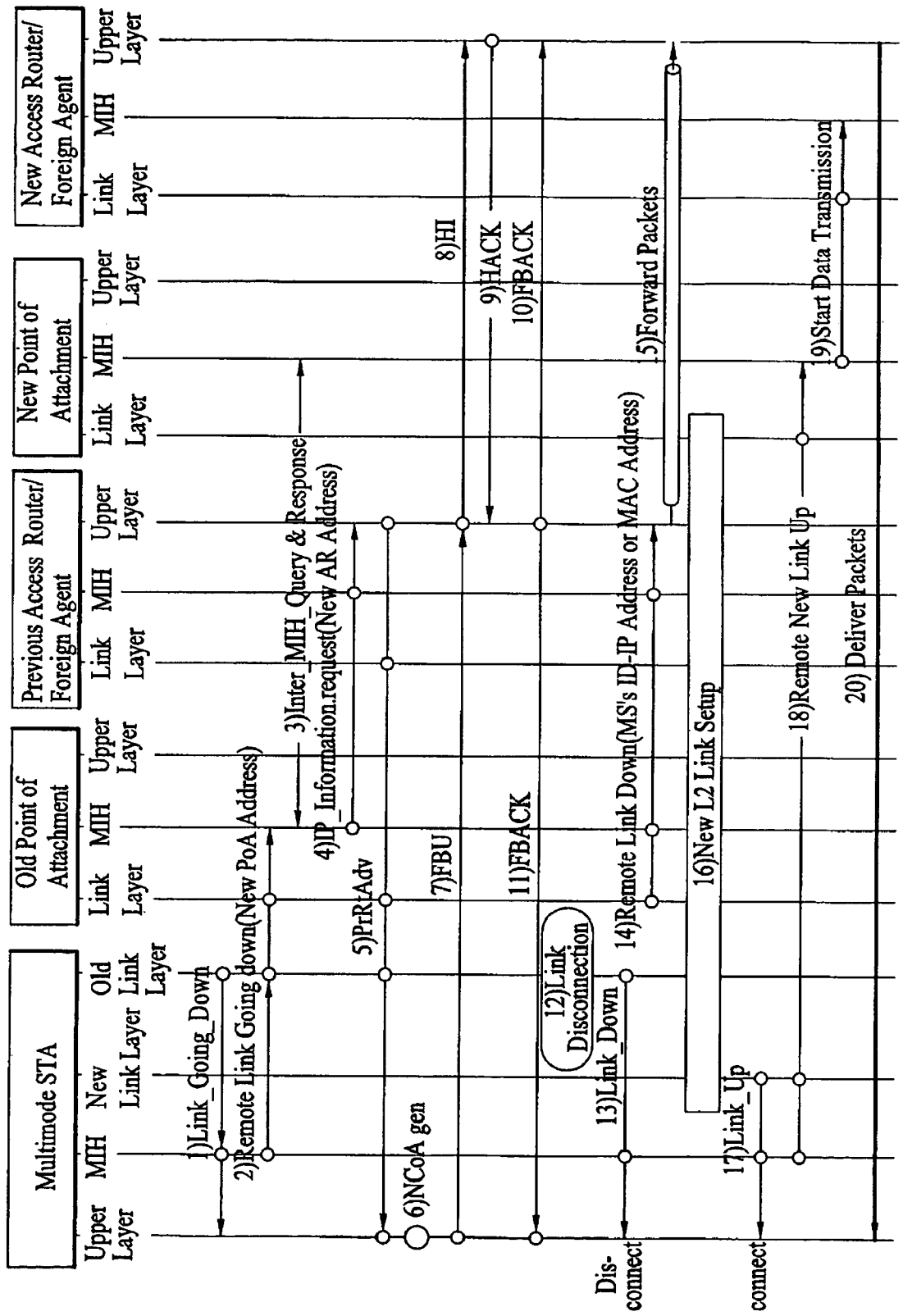
FIG. 18 is a flowchart according to another preferred embodiment of the present invention.

FIG. 18 is a flowchart according to another preferred embodiment of the present invention, in which a link with an old PoA is disconnected prior to configuring a link with a new PoA in case of using FMIPv6.

Referring to FIG. 18, the steps of the present embodiment using FMIPv6 are similar to those of the former embodiment shown in FIG. 16 and corresponds to a case a step (12) that a connection to an old link is disconnected due to such a reason as a migration of a mobile subscriber station and the like after completion of the steps (1)~(11) with a new access router.

Once a connection with an old link is disconnected, an MIH of the mobile subscriber station is notified of the link disconnection from a lower link layer (13).

If an old PoA manages a connection to the mobile subscriber station, the old PoA recognizes that the connection to the mobile subscriber station is released and then notifies an old access router that a connection of a specific mobile subscriber station is lost (14).

Information transmitted to discriminate a specific mobile subscriber station is an IP address or link layer address (e.g., MAC address) used by the mobile subscriber station at an old PoA, an electronic serial number (ESN) and the like. This information is includes in Remote Link Down, which is notified to the old access router by the old PoA, to be transmitted. The access router having received this information delivers a packet of the specific mobile subscriber station of which connection is released via a tunnel established in advance (15).

And, the rest of the steps are similar to those explained in FIG. 16.

Figure 19:
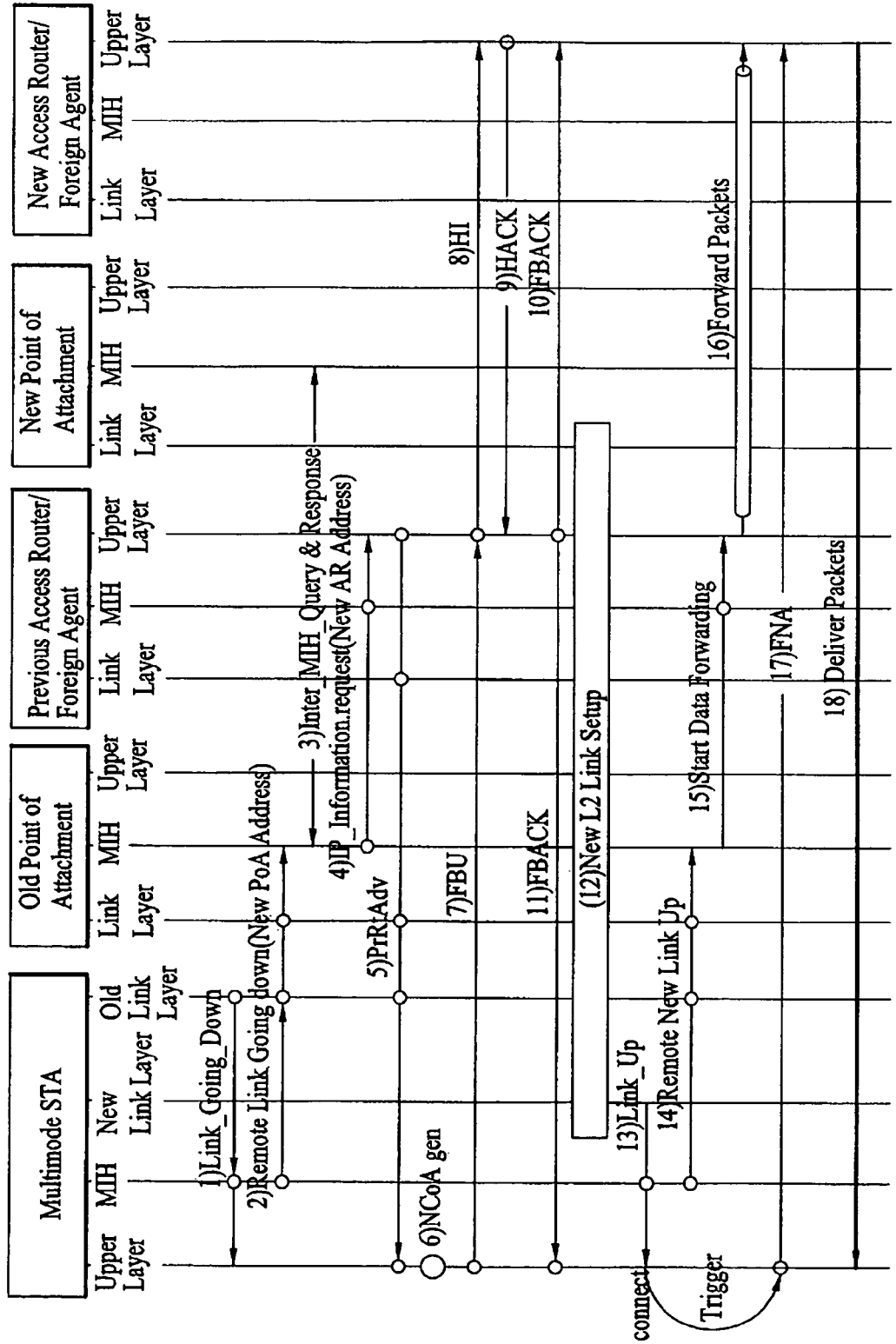
FIG. 19 is a flowchart according to another preferred embodiment of the present invention.

FIG. 19 is a flowchart according to another preferred embodiment of the present invention, in which a packet quickly forwarded from a new PoA is received after a link has been configured by a trigger transmitted to an upper layer from an MIH in configuring the link with the new PoA in case of using FMIPv6.

Referring to FIG. 19, the steps of the present embodiment using FMIPv6 are similar to those of the former embodiment shown in FIG. 16. After completion of the steps (1)~(11) with a new access router, a configuration procedure with a new link is carried out (12).

Once a link configuration with a new PoA is completed, an MIH is notified by a link layer of a mobile subscriber station that a new link has been configured. And, this is transmitted to an upper layer including a mobility management entity (13).

Having received the information indicating that the new link had been configured, the mobility management entity immediately transmits 'Fast Neighbor Advertisement' to the new access router (17).

Having received 'Fast Neighbor Advertisement', the access router transmits a received packet to a mobile subscriber station (18).

Steps (14)~(16) relate to a request message sent by the mobile subscriber station/mobile station to the handover management module of the source network to command the data to be sent to the handover management module of the target network. After receiving the request message, the handover management module of the source network delivers the data, as requested/commanded, to the handover management module of the target network. Lastly, the handover management module/entity of the target network transmits the data delivered from the handover management module of the source network to the origin of the request message—the mobile terminal in step (18).

Figure 20:
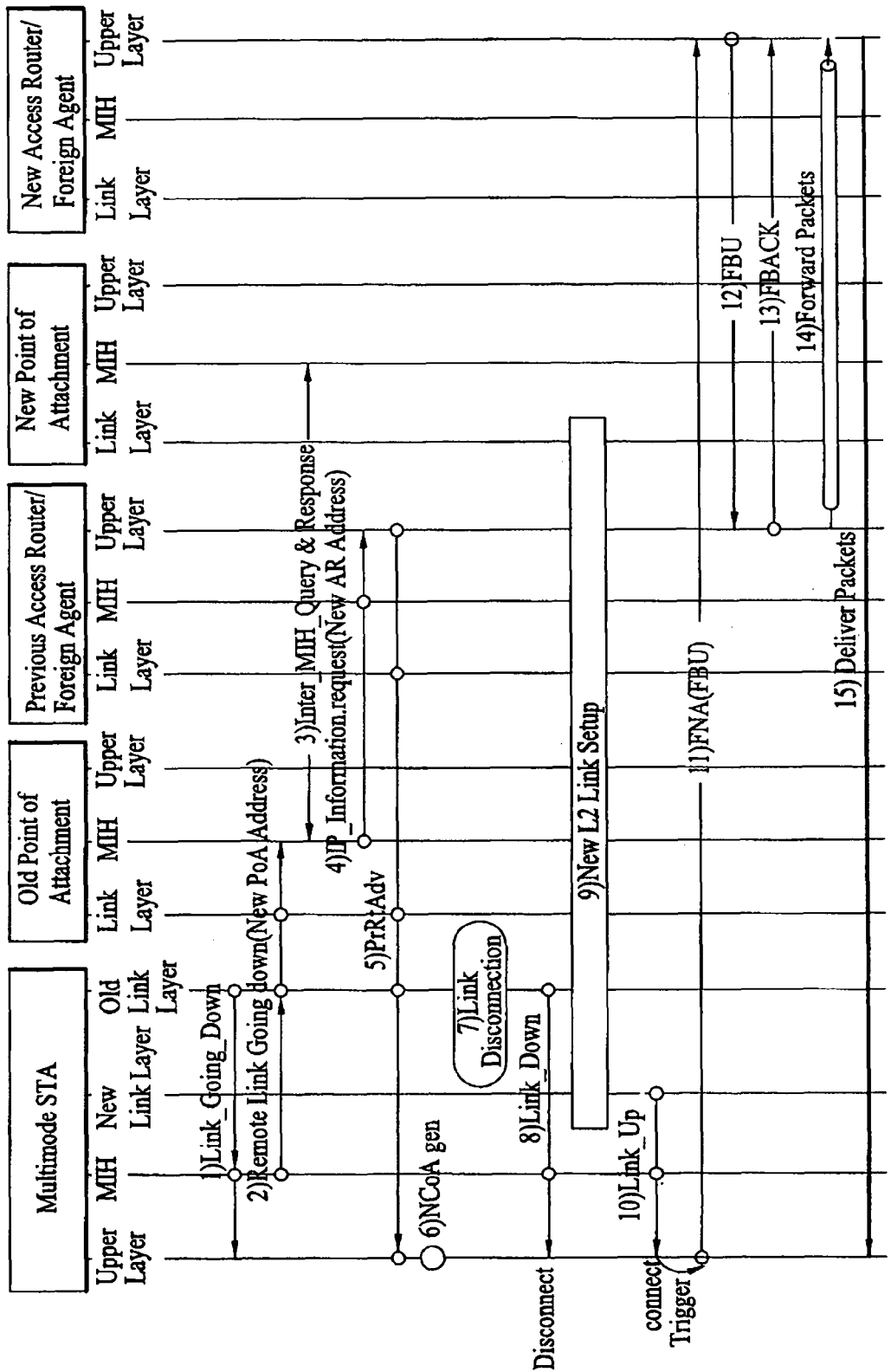
FIG. 20 is a flowchart according to another preferred embodiment of the present invention.

FIG. 20 is a flowchart according to another preferred embodiment of the present invention, in which a link with an old PoA is disconnected prior to configuring a link with a new PoA in case of using FMIPv6. In FIG. 20, a packet quickly forwarded from a new PoA is received after a link has been configured by a trigger transmitted to an upper layer from an MIH in configuring the link with the new PoA.

Referring to FIG. 20, a new CoA is created by performing a procedure with a new access router according to a procedure similar to that of the former embodiment shown in FIG. 16 in case of using FMIPv6 (1)~(6).

A link with an old PoA is disconnected due to a prescribed reason (7).

An upper layer is notified via an MIH from a link layer of a mobile subscriber station that the link was disconnected (8).

The mobile subscriber station initiates a link configuring procedure with a new PoA and configures a link (9).

Once the link configuration is completed, an upper layer including a mobility management entity is notified of the completion of the link configuration by a new link layer of the mobile subscriber station (10).

The mobility management entity having received the corresponding notification immediately sends 'Fast Neighbor Advertisement (Fast Binding Update)' (11) so that a new access router can receive the transmitted data by establishing a tunnel with an old access router (12) (13).

After the tunnel has been established, the old access router transmits a packet to the new access router through the tunnel (14).

And, the new access router delivers the packet to the mobile subscriber station (15).

Figure 21:
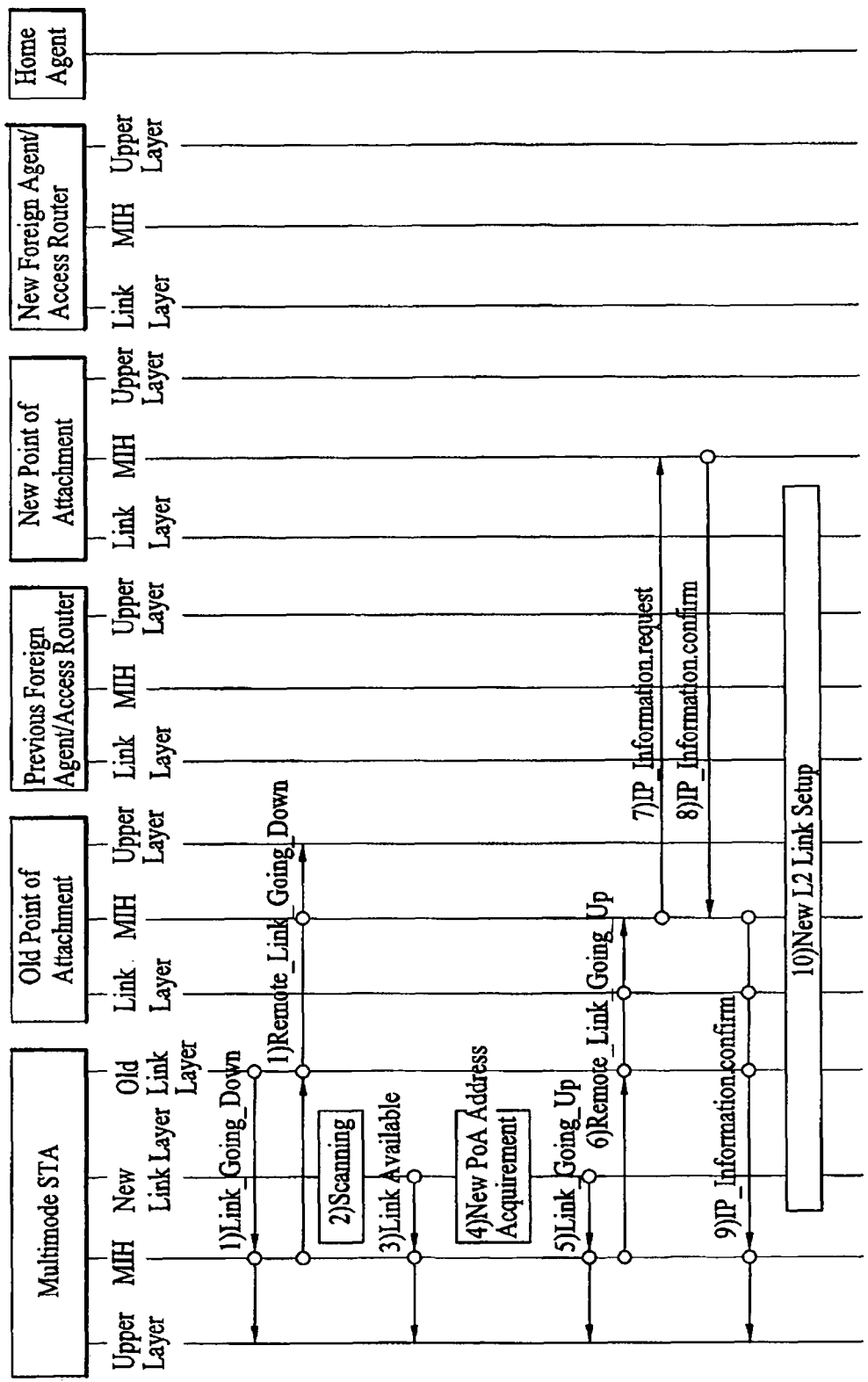
FIG. 21 is a flowchart according to another preferred embodiment of the present invention.

FIG. 21 is a flowchart according to another preferred embodiment of the present invention.

In case that a mobile subscriber station uses MIPv4 or MIPv6 as a mobility support protocol and an FA-CoA or non-status type address information as a care of address (CoA), information indicating that an IP address to be used at a new PoA is usable without changing a current IP address is obtained from an old PoA before a handover is attempted to the new PoA.

Referring to FIG. 21, a mobile subscriber station triggers Remote_Link_Going_Up to an old PoA (6).

The old PoA delivers IP_Information.request for querying IP information usable as a new PoA by the mobile subscriber station to the new PoA (7). In this case, the IP_Information.request is transmitted by including IP address information used by the old PoA.

The new PoA compares the information included in the IP_Information.request to an IP address (including a temporary IP address) the mobile subscriber station can use through handover. If an old address is usable, the new PoA makes a response in a manner of setting 'IP Address Change Notification' field to 1 (IP address change unnecessary) in IP_Information.confirm message (8).

The old PoA receives the IP_Information.confirm and then forwards it to the mobile subscriber station (9).

In the present embodiment, the response (IP_Information.confirm) for IP_Information.request is created and delivered by the new PoA, which corresponds to a case that the new PoA recognizes the information by listening to an advertisement of a router or foreign agent connected to the new PoA. Alternatively, if there exists no available address information, IP_Information.request is delivered to an access router or foreign agent so that the access router or foreign agent can deliver IP_Information.confirm to the new PoA in response to the IP_Information.request. So, the new PoA is enabled to deliver it to the mobile subscriber station.

Figure 22:
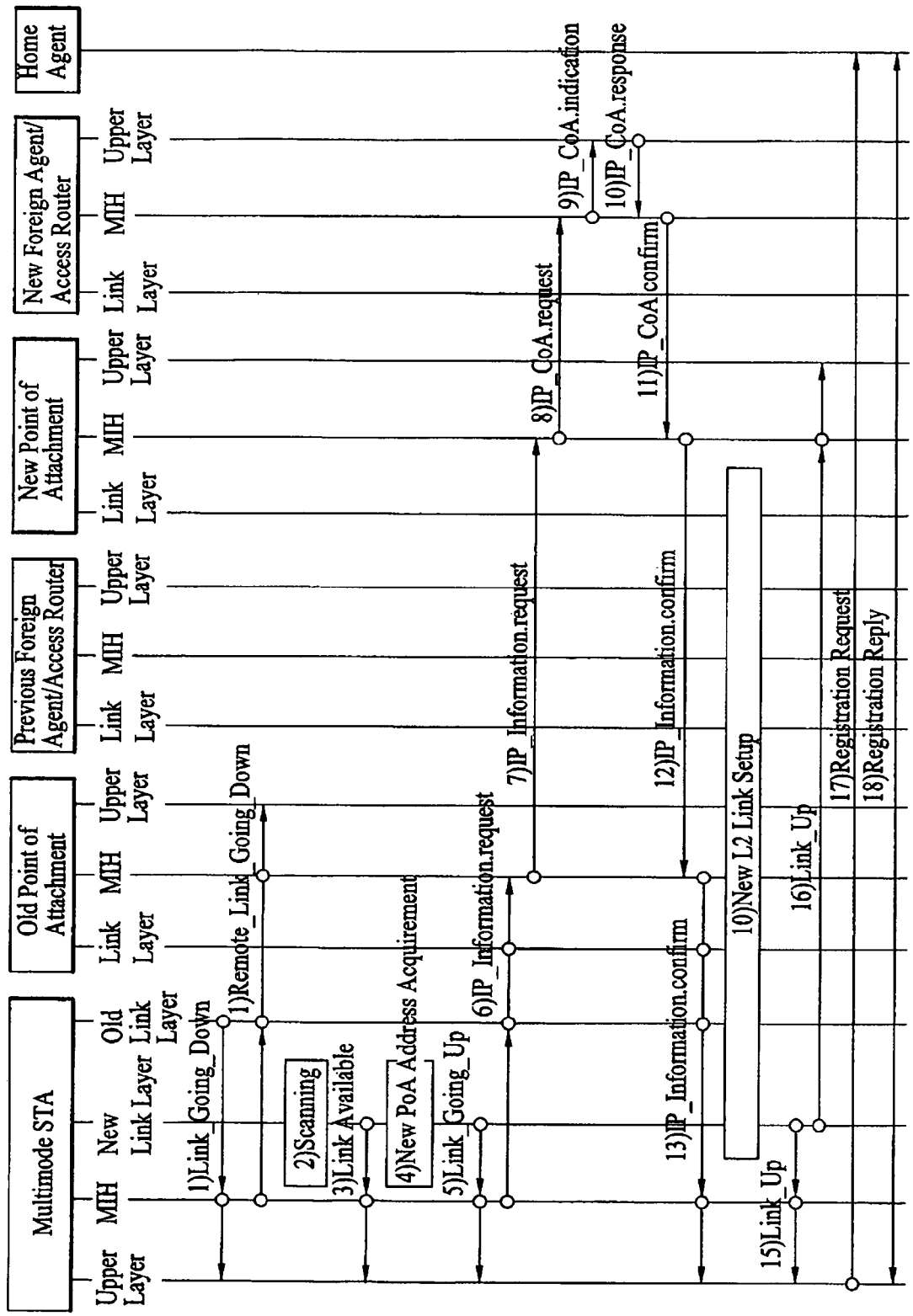
FIG. 22 is a flowchart according to another preferred embodiment of the present invention.

FIG. 22 is a flowchart according to another preferred embodiment of the present invention.

In case that a mobile subscriber station uses MIPv4 or MIPv6 as a mobility support protocol and an FA-CoA or non-status type address information as a care of address (CoA), an FA-CoA or a non-status type address for a new PoA is allocated from an old PoA in making a handover to the new PoA.

Referring to FIG. 22, the procedure of the present embodiment is similar to that of the former embodiment shown in FIG. 10.

Yet, a mobile subscriber station transmits IP_Information.request requesting IP address information usable at a new PoA instead of triggering (transmitting) Remote_Link_Going_Down to an old PoA (7).

Having received the IP_Information.request, the new PoA compares the information included in the IP_Information.request to an IP address (including a temporary IP address) usable by the mobile subscriber station after handover. If an old address is unusable and if the IP address needs to be changed, the new PoA transmits IP_Information.confirm including IP address information to the mobile subscriber station via the old PoA (12~13).

In the present embodiment, since the new PoA does not have information sufficient to make a response to the IP_Information.request, information is obtained by delivering IP_CoA.request (or, IP_Information.request for the same effect) for requesting IP associated information to an access router or foreign agent connected to the new PoA. And, the mobile subscriber station includes this information in IP_Information.confirm to deliver. Alternatively, in case of having sufficient information associated with IP by listening to an advertisement of the access router or foreign agent, the new PoA can directly deliver the corresponding information to the mobile subscriber station.

Figure 23:
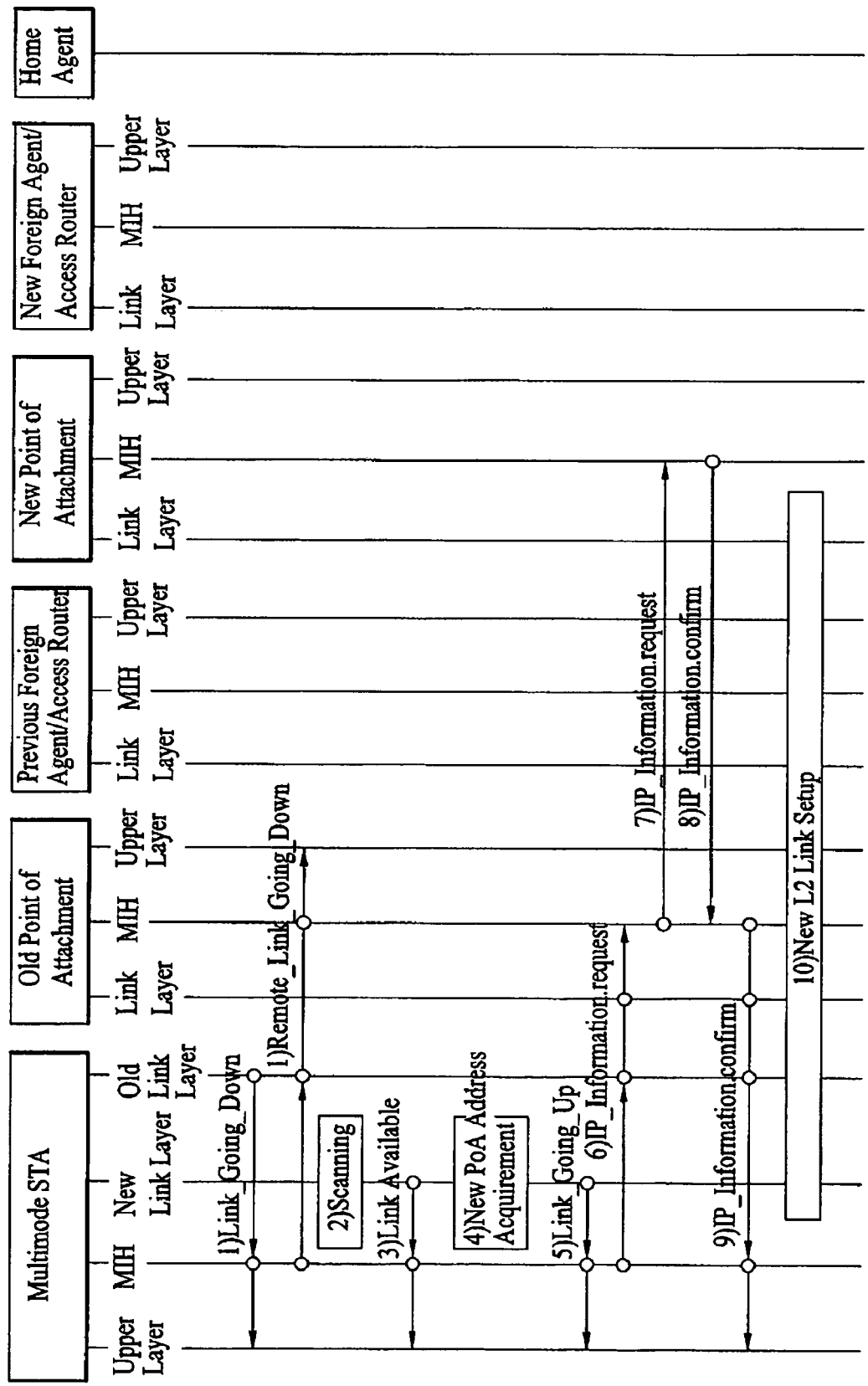
FIG. 23 is a flowchart according to another preferred embodiment of the present invention.

FIG. 23 is a flowchart according to another preferred embodiment of the present invention.

In case that a mobile subscriber station uses MIPv4 or MIPv6 as a mobility support protocol and an FA-CoA or non-status type address information as a care of address (CoA), information indicating that IP address information is not changed is obtained in a manner that the mobile subscriber station delivers an IP address information request to a new PoA via an old PoA before a handover is attempted to the new PoA.

Referring to FIG. 23, a mobile subscriber station transmits IP_Information.request to a new PoA via an old PoA (6~7).

The new PoA compares the information included in the IP_Information.request to an IP address (including a temporary IP address) usable by the mobile subscriber station after handover. If an old address is usable. The new PoA makes a response to the old PoA by setting 'IP Address Change notification' field in IP_Information.confirm message to 1 (IP address change unnecessary) (8).

Having received the IP_Information.confirm message, the old PoA delivers it to the mobile subscriber station (9).

In the present embodiment, the new PoA creates and delivers the response (IP_Information.confirm) for the IP_Information.request, which corresponds to the case that the new PoA recognizes the information by listening to an advertisement of a router or foreign agent connected to the new PoA. Yet, if there exists no available IP address associated information, IP_Information.request is delivered to an access router or foreign agent so that the access router or foreign agent can deliver IP_Information.confirm to the new PoA in response to the IP_Information.request. so, the new PoA can forward it to the mobile subscriber station.

Figure 24:
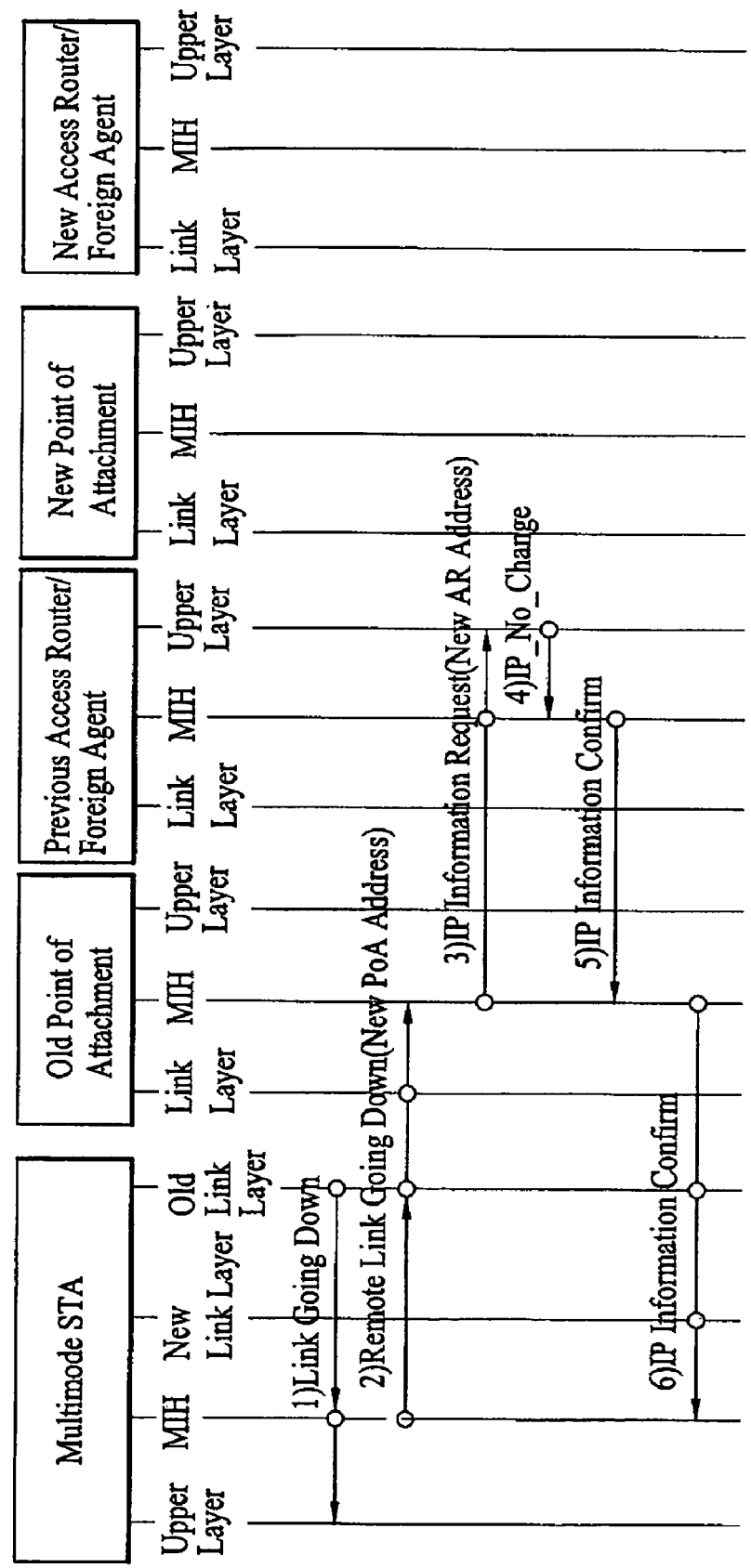
FIG. 24 is a flowchart according to another preferred embodiment of the present invention.

FIG. 24 is a flowchart according to another preferred embodiment of the present invention, in which in case of using FMIPv6, information indicating that a previously used IP address is usable without being changed is obtained from an old PoA with reference to address information to be used at a new PoA.

Referring to FIG. 24, a mobile subscriber station triggers Remote_Link_Going_Down to an old PoA (2).

The old PoA transmits IP_Information.request for querying IP information usable at a new PoA by the mobile subscriber station to an old access router (3).

If the mobile subscriber station is able to use a previous IP address at the new PoA without changing the previous IP address after handover, the old access router transits IP_No_Change to its MIH (4).

The MIH of the old access router sets 'IP Address notification' field in IP_Information.confirm message to 1 (IP address change unnecessary) and then transmits the message to the old PoA (5).

And, the old PoA forwards the message to the mobile subscriber station (6).

Figure 25:
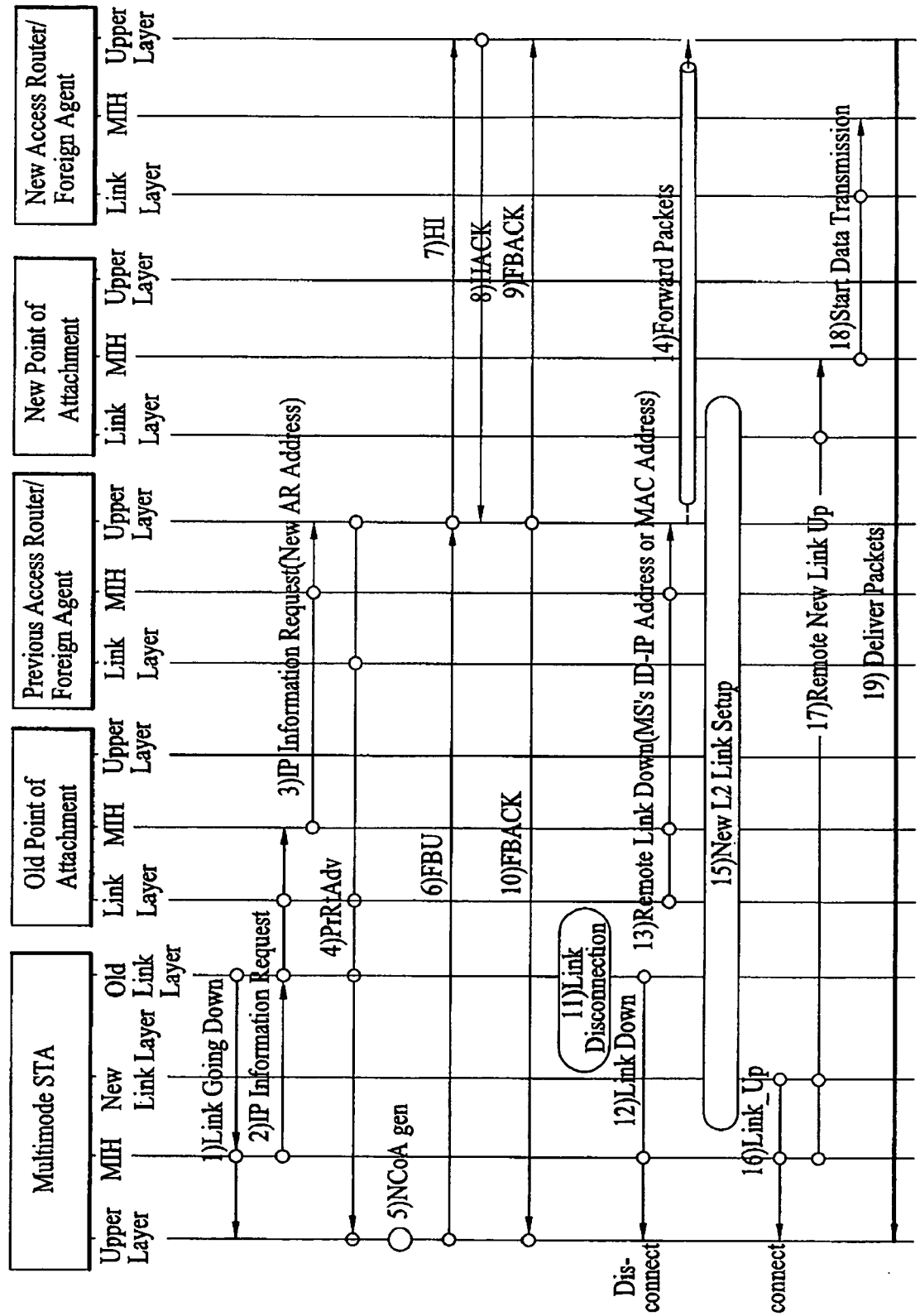
FIG. 25 is a flowchart according to another preferred embodiment of the present invention.

FIG. 25 is a flowchart according to another preferred embodiment of the present invention, in which steps are similar to those of the former embodiment shown in FIG. 16.

Referring to FI. 25, a mobile subscriber station transmits IP_Information.request for requesting IP information usable at a new PoA instead of triggering Remote_Link_Going_Down to an old PoA (2).

Having received the IP_Information.request, the old PoA forwards it to an old access router (3).

The old access router transmits a proxy advertisement message for a new access router to the mobile subscriber station with reference to an address of the new access router contained in the request message (4).

Figure 26:
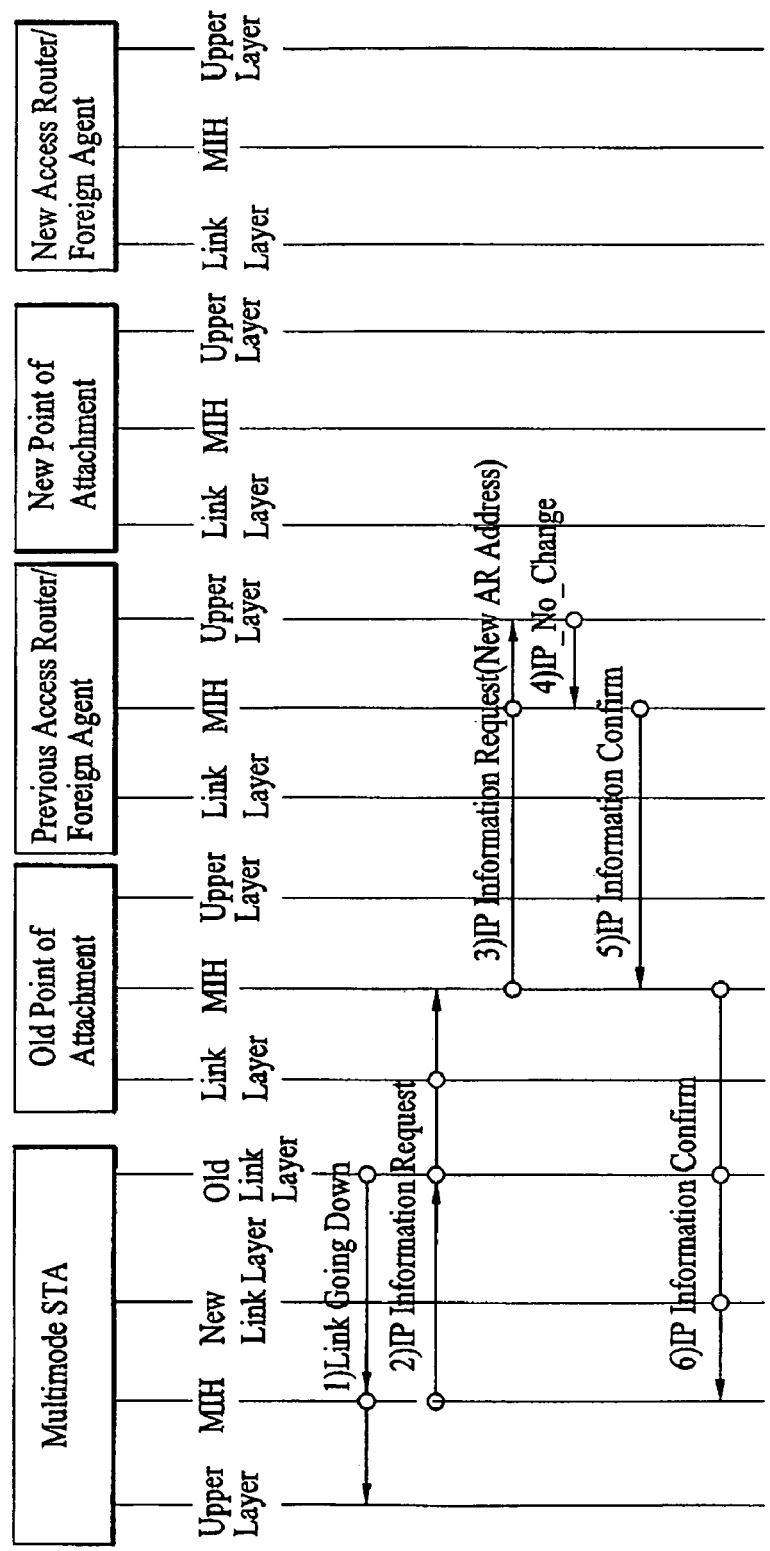
FIG. 26 is a flowchart according to another preferred embodiment of the present invention.

FIG. 26 is a flowchart according to another preferred embodiment of the present invention, in which steps are similar to those of the former embodiment shown in FIG. 24.

Referring to FIG. 26, a mobile subscriber station transmits IP_Information.request to an old PoA instead of triggering (forwarding) Remote_Link_Going_Down (2).

Figure 27:
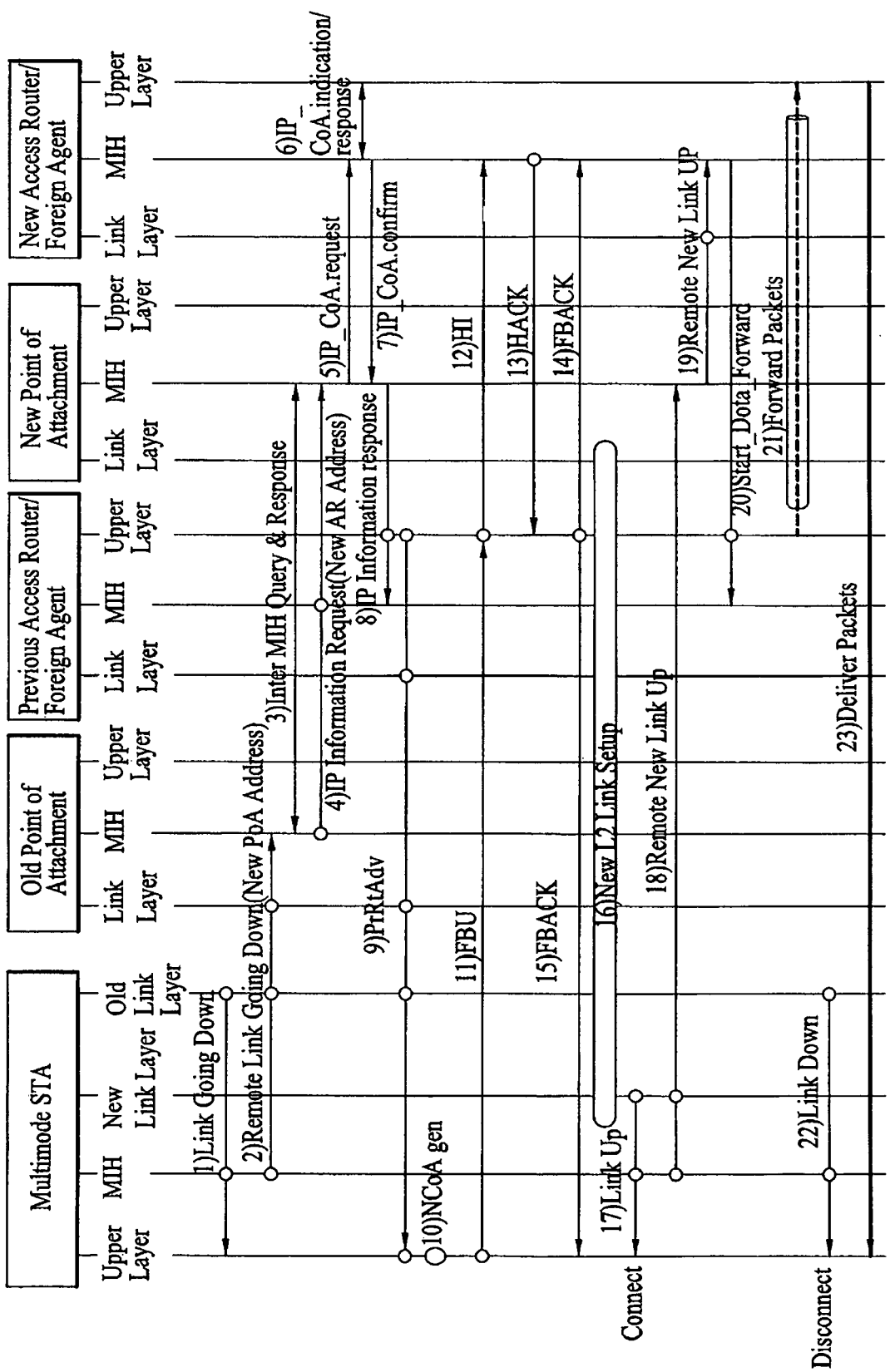
FIG. 27 is a flowchart according to another preferred embodiment of the present invention.

FIG. 27 is a flowchart according to another preferred embodiment of the present invention, in which steps are similar to those of the former embodiment shown in FIG. 16. Yet, an old access router obtains IP address information of a multimode mobile subscriber station by communicating with a new access router via a new PoA and data is forwarded to the new access router from the old access router via remote Link Up.

Referring to FIG. 26, information indicating that a status of a currently accessed link is going down is discovered. And, Link Going Down trigger is transmitted to an MIH and an upper layer needing this information (1). And, the information indicating that the link is going down is transmitted to an MIH layer of a currently accessed PoA. The information transmission can be performed using Layer 2 via a link or using Layer 3 or higher. The information contains an address of a PoA (point of attachment) to be newly accessed. The address of the new PoA can be obtained via an information service in advance or obtained via a neighbor broadcast. The MIH obtains information for an available link layer by previously instructing periodic scans to lower link layers and is instructed of a list of candidate link layers by an upper management entity to maintain corresponding information (2).

An MIH of a currently accessed PoA obtains network situation information of a new PoA by exchanging information (Inter MIH Query & Response) with an MIH of the new PoA using an address of the new PoA carried by the Link Going Down (3).

An MIH of an old PoA makes a request for IP address information for the mobile subscriber station to use after handover to a new access router via the MIH of the new PoA. And, the MIH of the old PoA plays a role in notifying the new PoA via this message exchange that a specific mobile subscriber station is going to initiate a handover to the new PoA. So, the new PoA requests to obtain additional information necessary for the handover of the specific mobile subscriber station from the old PoA (4)~(7).

Address information is notified to an old access router via IP Information response (8).

A currently accessed access router receives information for an access router of the new PoA and then transmits PrRtAdv (proxy router advertisement) carrying the information to the mobile subscriber station (9).

The multimode mobile subscriber station configures 'new care of address (NCoA)' usable by a new access router connected to the new PoA via the received PrRtAdv (10).

The multimode mobile subscriber station and the access router perform a procedure for FMIPv6 (11) (12) (13) (14) (15).

A link equal to or lower than Layer 2 with a new link is configured (16).

Information indicating that the mobile subscriber station has handed over to the new access router is assured in a manner that the link configuration with the new link is notified to the new PoA and an MIH of the new access router via Remote Link Up as well as an upper layer (17)~(19).

The MIH of the new access router having received the remote Link Up trigger instructs data forwarding from the old access router by sending Start_Data_Forward to the old access router. In case that the data transfer is achieved between two PoAs, the MIH of the new PoA can identically instruct the data forwarding by transmitting Start_Data_Forward to an MIH of the old access router (20).

A packet is forwarded to the new access router from the old access router (21).

It is notified that the old link is disconnected. This procedure can be performed by a command of the MIH after completion of the configuration with the new link. This procedure takes place right after the new link configuration. Yet, this procedure may be sustained for a predetermined time for the duplexing with the new link (22).

Knowing that the link between the mobile subscriber station and the new PoA has been completed, the access router of the new PoA immediately transmits the forwarded data to the multimode mobile subscriber station without delay (23).

Figure 28:
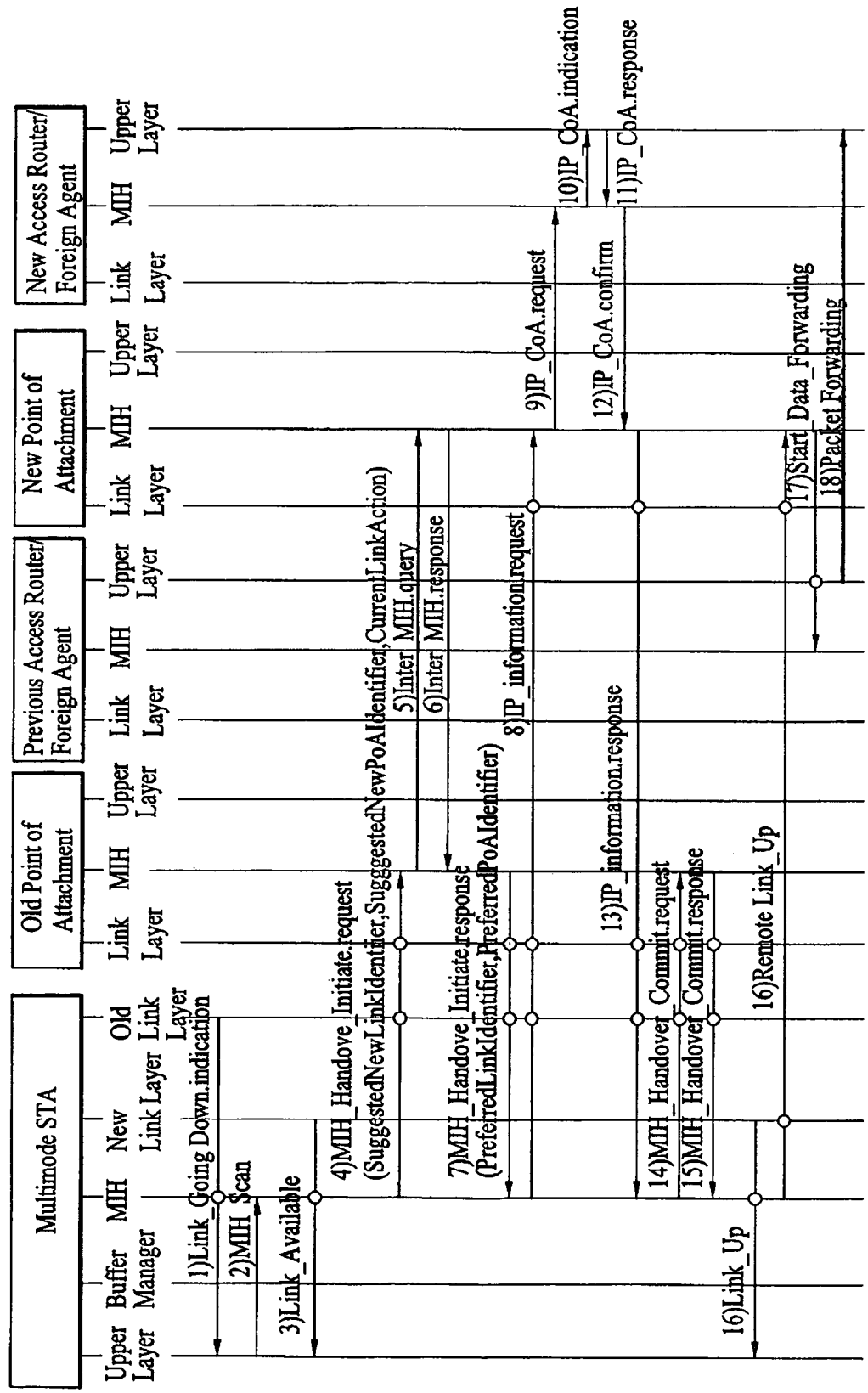
FIG. 28 is a flowchart according to another preferred embodiment of the present invention.

FIG. 28 is a flowchart according to another preferred embodiment of the present invention, in which an MIH level handover scenario using a command proposed by the present invention is shown.

Referring to FIG. 28, an old link of a mobile subscriber station discovers that a status of a currently accessed link is going down and then transmits Link_Going_Down.indication trigger to an MIH and an upper layer that needs this information (1).

The upper layer instructs an available link scan via MIH_Scan command to the MIH.

A new link available for a handover informs that its link is available for a handover via Link_Available (3).

The MIH of the mobile subscriber station transmits its intention to hand over to a potentially handover available link via a scan by sending MIH_Handover_Initiate.request to an MIH of an old PoA (4).

The MIH of the old PoA queries the MIH of the new PoA about whether a resource of a proposed new link is sufficient and simultaneously informs the MIH of the new PoA that the mobile subscriber station is going to hand over to a corresponding PoA, via Inter_MIH.query (5).

The MIH of the new PoA informs an MIH of the old PoA of a result requested via the Inter_MIH.query through Inter_MIH.response (6).

The old PoA informs the mobile subscriber station of a handover available PoA based on information obtained through the Inter_MIH.query and Inter_MIH.response. In this case, the old PoA can select to indicate a link different from the link requested by the mobile subscriber station (7).

To obtain IP address information for the selected link in advance, the mobile subscriber station transmits IP_Information.request to the MIH of the new PoA. Alternatively, the MIH of the old PoA having obtained the selected link via the Inter_MIH.response can request a new IP address of the mobile subscriber station by directly transmitting IP_Information.request to the MIH of the new PoA (7).

The MIH of the PoA requests and obtain a new IP address of the mobile subscriber station from a connected access router (8)~(12).

The MIH of the new PoA transmits the obtained IP address to the mobile subscriber station via IP_Information.response (13).

The mobile subscriber station informs the MIH of the old PoA by transmitting MIH_Handover_Commit.request to the MIH of the old PoA (14).

The old PoA transmits MIH_Handover_Commit.response to the mobile subscriber station in response to the MIH_Handover_Commit.request (15).

The new link of the mobile subscriber station announces that the mobile subscriber station has succeeded in the new link configuration by transmitting Link_Up to an upper layer and remotely transmits Link_Up to the MIH of the new PoA (16).

The MIH of the new PoA requests data forwarding to the new PoA from the old PoA by transmitting Start_Data_Forward to the old access router. So, a packet is forwarded to the new access router from the old access router (17) (18). Alternatively, the data forward request can be achieved in a manner that the new PoA makes a request to the new access router for the data forwarding and that the new access router makes a request to the old access router. In case that the data forwarding is achieved between PoAs, the data forwarding is requested to forward data in a manner that the new PoA delivers Start_Data_Forward to the old PoA without making a request to the access router.

FIG. 29 is a flowchart according to a further preferred embodiment of the present invention, in which an IP address is configured in advance via an information server proposed by the present invention using pre-configuration of an IP address to be used after handover.

Referring to FIG. 29, an old/source/previous link of a mobile subscriber station obtains information indicating that a status of a currently accessed link is going down and then transmits Link_Going_Down.indication trigger to an MIH and an upper layer that needs this information. The information is then delivered to an old PoA. In this case, an address (MAC address or IP address) of a PoA to be newly accessed is included in the information to be delivered (1).

Knowing the information indicating that the link of the mobile subscriber station is going down and the address of the PoA to which the mobile subscriber station is going to move, the old PoA makes a request to an information server for information associated with IP address configuration usable at the new PoA by the mobile subscriber station (2). In other words, the mobile subscriber station/mobile terminal establishes a network handover module (e.g., MIH) for converging information from at least one network interface module (e.g., MAC) associated with at least one of either homogeneous or heterogeneous network into a unified presentation. Thereafter, the mobile subscriber station sends a query message requesting an internet protocol address related message from the mobile subscriber station/terminal to an information server of a network.

The information server delivers the information associated with the IP address configuration to the PoA having made the request (3). The information associated with the IP address is relayed to the mobile subscriber station to be forwarded to the upper layer of the mobile subscriber station (3). In other words, the mobile subscriber station receives a response message in response to the query request message, which includes internet protocol address information of a target network, from the information server of the network.

Alternatively, another method of receiving IP address configuration information via an information service corresponds to a method that an MIH of a mobile subscriber station directly requests and receives information from an information server.

The mobile subscriber station makes a request to the information server for IP address associated information (4).

The information server delivers the mobile subscriber station requesting IP address associated information useable at a new PoA after handover. The information is then delivered to the upper layer of the mobile subscriber station (5).

The upper layer of the mobile subscriber station, i.e., a layer associated with the IP address configuration, e.g., an IP layer or a mobility protocol management layer transmits 'Router Solicitation' in case of IPv6 or 'Agent Solicitation' in case of Mobile IPv4 to configure an IP address prior to the handover. The 'Router Solicitation' or 'Agent Solicitation' is delivered to an access router to be used at the new PoA or foreign agent by unicast or tunneled to an access router of a current PoA or a foreign agent (6).

The access router or foreign agent having received the 'router Solicitation' or 'Agent Solicitation' of the mobile subscriber station transmits a corresponding response to the mobile subscriber station by unicast or tunneling (7).

The mobile subscriber station configures a link with a new PoA (9).

The upper layer is informed via the MIH of the mobile subscriber station that a new link has been configured (10).

Since an IP layer packet can be transmitted due to the configuration of the new link, the upper layer performs a registration procedure with a home agent (11) (12).

As another IP address configuration method, there is a method that a mobile subscriber station obtains a DHCP server address of a new PoA via an information server and that an IP address to be used by the new PoA is allocated with communications with a DHCP server via an old PoA before a mobile subscriber station starts handover.

Accordingly, in the IP address reconfiguration method in handover between heterogeneous networks, by enabling Layer 3 (L3) to recognize Layer 2 (L2) handover through communications between MIHs, it is able to avoid transmitting unnecessary messages and to reduce a time taken for a handover.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of communicating information for a mobile station in a wireless mobile communication network, the method comprising:

transmitting first information from a handover management module of the mobile station to a first handover management module of a first point of attachment (PoA), wherein the first PoA has a wireless access to the mobile station and is coupled to a first access router, wherein the first information comprises an address of a second PoA which is obtained prior to transmitting the first information to the first handover management module of the first PoA, and wherein the first information indicates that a connection between the mobile station and the first PoA is going down;

the first handover management module of the first PoA exchanging second information with a second handover management module of the second PoA in response to receipt of the first information in order to obtain information of the second PoA and information about a second access router, and to provide the second PoA with information necessary for a handover of the mobile station, wherein the information of the second PoA includes a type of a mobility management protocol used by the second PoA;

the first handover management module of the first PoA notifying the second PoA that the mobile station is going to initiate a handover to the second PoA through an exchange of the second information;

the first PoA informing the first access router via the first handover management module that the mobile station is going to move to the second access router using an Internet Protocol (IP) information request for the second access router, wherein the second access router is coupled to the second PoA after the second information is exchanged in order to establish an association with the second PoA;

the first access router transmitting an IP information confirmation to the first PoA in response to the IP information request, wherein the IP information confirmation includes a bitmap field, a single bit field indicating whether a current address needs to be changed when the mobile station moves to the second PoA, and a time stamp field indicating a time difference between receipt and encapsulation of an agent advertisement or a router advertisement;

the first access router transmitting a proxy router advertisement for the second access router to the mobile station in response to the informing by the first PoA;

the mobile station establishing a new connection with the second PoA at a link layer of the mobile station using the proxy router advertisement while the mobile station maintains the connection to the first PoA;

the mobile station informing the first handover management module of the first PoA via the handover management module of the mobile station that the new connection was established with the second PoA;

the first PoA triggering a handover management module of the first access router to forward data to the second access router in response to the informing by the mobile station;

the first access router forwarding the data to the second access router while the mobile station maintains the connection to the first PoA; and the second access router transmitting the data to the mobile station, wherein the mobile station, the first PoA, the second PoA, the first access router, and the second access router are different entities, wherein the handover management module of the mobile station, the handover management module of the first access router, a handover management module of the second access router, the first handover management module, and the second handover management module each comprise a media independent handover management module, wherein the first PoA and the second PoA each comprise a broadband wireless access network base station, a wireless local area network access point, or a cellular system base station, wherein the first handover management module of the first PoA exchanges the second information with the second handover management module of the second PoA using the address of the second PoA, wherein the mobile station uses Fast Handovers for Mobile Internet Protocol version 6 (FMIPv6), and wherein each bit of the bitmap field corresponds to a mobility management protocol support type.

2. The method of claim 1, further comprising:
configuring a new address in the mobile station using the proxy router advertisement, wherein the new address is used by the second access router.

3. The method of claim 2, further comprising:
notifying an upper-layer of the mobile station via the link layer that a network configuration of the new connection is completed, wherein the link layer is hierarchically higher than a layer where the handover management module of the mobile station is implemented.

4. The method of claim 3, further comprising:
the second PoA informing the handover management module of the second access router that data can be transmitted due to the configuration of the new connection; and
informing the upper-layer of the mobile station via the link layer that the connection has been released.

* * * * *